(12) United States Patent
Tanaka et al.

(10) Patent No.: US 7,434,248 B2
(45) Date of Patent: Oct. 7, 2008

(54) BROADCAST SYSTEM AND APPARATUS, SYNC INFORMATION REPLACING APPARATUS AND METHOD, PROGRAM, AND RECORDING MEDIUM RECORDING THE PROGRAM

(75) Inventors: Akihiro Tanaka, Osaka (JP); Toshiya Mori, Settu (JP); Seigo Nakamura, Hirakata (JP); Hideki Kagemoto, Nara (JP); Koichiro Yamaguchi, Ashiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 856 days.

(21) Appl. No.: 10/483,788

(22) PCT Filed: Jul. 26, 2002

(86) PCT No.: PCT/JP02/07578

§ 371 (c)(1),
(2), (4) Date: Jul. 12, 2004

(87) PCT Pub. No.: WO03/010905

PCT Pub. Date: Feb. 6, 2003

(65) Prior Publication Data

US 2004/0263689 A1 Dec. 30, 2004

(30) Foreign Application Priority Data

Jul. 27, 2001 (JP) ............... 2001-227418
Jan. 23, 2002 (JP) ............... 2002-013902

(51) Int. Cl.
*H04N 7/18* (2006.01)
*H04N 7/173* (2006.01)
(52) U.S. Cl. ........................... 725/80; 725/97

(58) Field of Classification Search ............... 725/80, 725/97
See application file for complete search history.

(56) References Cited

U.S. PATENT DOCUMENTS

| 5,652,627 | A | * | 7/1997 | Allen ................. 348/497 |
| 6,038,000 | A | | 3/2000 | Hurst, Jr. |
| 6,101,195 | A | * | 8/2000 | Lyons et al. ........... 370/498 |
| 6,741,290 | B1 | * | 5/2004 | Wells ................. 348/512 |

FOREIGN PATENT DOCUMENTS

| EP | 0 881 838 A1 | 12/1998 |
| JP | 11-88314 | 3/1999 |
| JP | 2000-244433 | 9/2000 |
| WO | WO 97/459965 | 12/1997 |

* cited by examiner

*Primary Examiner*—Chris Kelley
*Assistant Examiner*—Franklin S Andramuno

(57) ABSTRACT

A broadcast system composed of a first broadcast apparatus and a second broadcast apparatus. The first broadcast apparatus broadcasts a broadcast program composed of contents stream data and attachment data, and provides the second broadcast apparatus with the broadcast program. The attachment data contains information that indicates timing with which the attachment data is to be reproduced in synchronization with the contents stream data. The image sync information contains PCRs generated by the PCR generating apparatus of the first broadcast apparatus based on the standard time for the first broadcast apparatus. The image sync information replacing apparatus of the second broadcast apparatus replaces the PCRs with other PCRs which are newly generated based on the standard time for the second broadcast apparatus so that it can correctly reproduce the attachment data in synchronization with the encoded contents stream data.

13 Claims, 23 Drawing Sheets

BROADCAST SYSTEM AND APPARATUS, SYNC INFORMATION REPLACING APPARATUS AND METHOD, PROGRAM, AND RECORDING MEDIUM RECORDING THE PROGRAM

TECHNICAL FIELD

The present invention relates to a broadcast system including two broadcast apparatuses: a first broadcast apparatus that broadcasts a program composed of contents data and attachment data by digital broadcasting; and a second broadcast apparatus that is supplied with the broadcast program and broadcasts the program by digital broadcasting.

BACKGROUND ART

In recent years, many countries have pursued changes from analog to digital in the terrestrial television broadcasting. Digital broadcasts have such merits as (1) frequency resources can be effectively used, and (2) high-quality images can be provided. In digital broadcasts, it is also possible to use attachment data in the broadcast programs, where the attachment data can be reproduced in synchronization with the images or voices and is written in a language such as BML (Broadcasting Markup Language).

Now, a brief description will be provided to explain the procedure of digital-broadcasting a program composed of image data and attachment data conforming to MPEG2-TS (Moving Picture Experts Group 2-Transport Stream) defined in the ISO/IEC13818. First, an encoder encodes (compresses) image data, which is a image file in a baseband form, a DV format or the like containing images captured with a digital video recorder or the like, to an MPEG2 format defined in the ISO/IEC13818. With this encoding, the image data is packetized into a plurality of image PESs (Packetized Elementary Streams) which are each 64-byte or smaller.

A plurality of image PESs make up one access unit. A DTS (Decoding Time Stamp) is attached to each image PES to be reproduced first in each access unit. The DTS contains a value called PCR (Program Clock Reference), which is one of PCRs sequentially generated by a PCR generating apparatus of a broadcasting station and is used to manage the time when the encoded image data is decoded.

The PCRs are values "0" to "$2^{33}-1$" that are generated by counting based on a standard clock frequency of 90 KHz. The PCRs are used for the DTS as described above, and are used in generating the image sync information that indicates the timing with which the attachment data is to be reproduced in synchronization with the image data.

The image PESs are further packetized by the encoder into a plurality of TS packets with a fixed length of 188 Kbyte. The TS packets of the image data and the attachment data are multiplexed by a multiplexing apparatus, digitally modulated by a modulator, and are broadcast.

Meanwhile, in the terrestrial television broadcasting, a broadcast program supply system has been established. In the broadcast program supply system, a key station, or a main broadcasting station supplies local broadcasting stations with broadcast programs. The key station broadcasts a program produced by itself, and at the same time supplies the local broadcasting stations with the broadcast program. The local broadcasting stations broadcast the supplied broadcast program as has been incorporated in their broadcasting schedules.

However, as the experience in conversion from analog to digital increases, a problem in such a broadcast program supply system in digital broadcasting has been found.

That is to say, when the local broadcasting stations broadcast a broadcast program received from the key station as they are in digital broadcasting, receivers that receive and reproduce the broadcast program cannot synchronize reproduction of the attachment data with that of the image data.

The cause of the above problem is considered as follows. The digital broadcast programs transferred from the key station to the local stations are composed of image data and attachment data that should be reproduced in synchronization. The attachment data contains image sync information, which contains PCRs generated by a PCR generating apparatus of the key station. On the other hand, the transferred image data is encoded by the local stations and DTSs containing PCRs generated by the PCR generating apparatuses of the local stations are attached to the image PESs. In general, a different standard time is set by each PCR generating apparatus in each broadcasting station, where the counting of the PCRs starts based on the standard time. As a result, the key station and the local stations generate different PCRs which are also contained in DTSs and attached to image PESs. In these circumstances, the local stations fail to reproduce attachment data in synchronization with image PESs encoded by the local stations since they use the image sync information transferred from the key station as it is.

DISCLOSURE OF THE INVENTION

It is an object of the present invention to provide a broadcast system in which when a local station broadcasts a program composed of image data and attachment data supplied from a key station, a receiver for receiving and reproducing the program controls to reproduce the attachment data in synchronization with the image data, and various techniques related to the broadcast system.

The above object can be achieved by a broadcast system comprising a first broadcast apparatus and a second broadcast apparatus, the first broadcast apparatus broadcasting a broadcast program including contents stream data and attachment data and providing the second broadcast apparatus with the broadcast program, the attachment data containing information that indicates timing with which the attachment data is to be reproduced in synchronization with the contents stream data, the first broadcast apparatus including: a first time value generating means for sequentially generating first time values that indicate current times relative to a first standard time; a first time value attaching means for sequentially attaching the generated first time values to a first encoded contents stream data generated by the first broadcast apparatus by encoding the contents stream data; a first sync information generating means for generating first sync information to be contained in the attachment data, the first sync information indicating, relative to one of the first time values, timing with which the attachment data is to be reproduced in synchronization with the first encoded contents stream data having the first time values attached thereto; and a first broadcast means for digitally broadcasting the attachment data and the first encoded contents stream data with the first time values attached thereto, the second broadcast apparatus including: a second time value generating means for sequentially generating second time values that indicate current times relative to a second standard time; a second time value attaching means for sequentially attaching the generated second time values to a second encoded contents stream data generated by the second broadcast apparatus by encoding the contents stream data provided from the first broadcast apparatus; a second sync information generating means for generating second sync information indicating timing which corresponds to the timing indicated by the first sync information and with which the attachment data is to be reproduced in synchronization with the second encoded contents stream data having the second time values; and a second broadcast means for digitally broadcasting (a) the attachment data containing the second sync information instead of the first sync information and (b) the second encoded contents stream data with the second time values attached thereto.

With the above construction, when the first broadcast apparatus is provided in a key station, and the second broadcast apparatus in a local station, a receiver can correctly reproduce a program broadcast by the local station by reproducing the attachment data in synchronization with the image data since the local station attaches the second time values to the encoded contents stream data and replaces the sync information before broadcasting the program.

In the above broadcast system, each piece of first sync information may further contain one of the first time values, the second broadcast apparatus further including a difference value storing means for storing in advance a difference value between the first standard time and the second standard time, and the second sync information generating means generates the second sync information based on the difference value and each first time value contained in the first sync information in the attachment data provided from the first broadcast apparatus.

With the above construction, when the first broadcast apparatus is provided in a key station, and the second broadcast apparatus in a local station, a receiver can correctly reproduce a program broadcast by the local station by reproducing the attachment data in synchronization with the image data since the local station stores in advance a difference value between the standard times of the key and local stations, generates the second sync information based on the difference value, and replaces the first sync information with the second sync information, before broadcasting the program.

In the above broadcast system, the attachment data may be formed as a stream, and the first time value attaching means further sequentially attaches the generated first time values to the attachment data stream, the second broadcast apparatus further including: a first time value detecting means for sequentially detecting the first time values from the attachment data stream provided from the first broadcast apparatus; and a difference value storing means for, for each of the detected first time values, calculating a difference between a detected first time value and a second time value that is generated by the second sync information generating means when the first time value is detected, and storing the calculation result as a difference value, and the second sync information generating means generates the second sync information based on the difference values and the first time values attached to the attachment data stream provided from the first broadcast apparatus.

With the above construction, when the first broadcast apparatus is provided in a key station, and the second broadcast apparatus in a local station, a receiver can correctly reproduce a program broadcast by the local station by reproducing the attachment data in synchronization with the image data since the local station calculates, for each detected first time value, a difference between a detected first time value and a second time value that is generated by the second sync information generating means when the first time value is detected, and generates the second sync information based on the difference values.

In the above broadcast system, each piece of first sync information may further contain one of the first time values, the first broadcast apparatus further includes a first time value transferring means for transferring the first time values generated by the first time value generating means to the second broadcast apparatus via a route different from a route for the attachment data, and the second broadcast apparatus further includes a difference value storing means for, for each of the first time values transferred by the first time value transferring means, calculating a difference between a first time value and a second time value that is generated by the second sync information generating means when the first time value is received, and storing the calculation result as a difference value, the second sync information generating means generates the second sync information based on each difference value and each first time value contained in the first sync information in the attachment data provided from the first broadcast apparatus.

With the above construction, when the first broadcast apparatus is provided in a key station, and the second broadcast apparatus in a local station, a receiver can correctly reproduce a program broadcast by the local station by reproducing the attachment data in synchronization with the image data since the local station calculates, for each first time value transferred from the first time value transferring means of the key station, a difference between a first time value and a second time value that is generated by the second sync information generating means when the first time value is received, and generates the second sync information based on the difference values.

In the above broadcast system, the first sync information may contain program start information that indicates a program start time based on the first standard time, the broadcast system further comprises a program start trigger sending means for sending a program start trigger so that the second broadcast apparatus receives, a predetermined time period earlier than a scheduled program start time, a program start trigger indicating that a broadcast program starts a predetermined time period later, and the second broadcast apparatus further includes a program start time value storing means for obtaining a second time value that is generated by the second time value generating means when the second broadcast apparatus receives the program start trigger, calculating the scheduled program start time from the obtained second time value, and storing the calculation result as a program start time value, the second sync information generating means generates the second sync information based on the program start time value if the first sync information containing the program start information is detected from the attachment data provided from the first broadcast apparatus, and the second broadcast means for digitally broadcasting (a) the attachment data containing the second sync information instead of the first sync information containing the program start information and (b) the second encoded contents stream data with the second time values attached thereto.

With the above construction, when the first broadcast apparatus is provided in a key station, and the second broadcast apparatus in a local station, a receiver can correctly reproduce a program broadcast by the local station by reproducing the attachment data in synchronization with the image data since the local station receives a program start trigger indicating the start of a broadcast program.

In the above broadcast system, the contents stream data and the attachment data may be transferred from the first broadcast apparatus to the second broadcast apparatus via different lines, the first sync information contains one of the first time values generated by the first time value attaching means, the first broadcast apparatus further includes a first time value transferring means for transferring the first time values generated by the first time value generating means to the second broadcast apparatus, and the second broadcast apparatus further includes a transfer delay value storing means for storing in advance a transfer delay value that indicates a time period, recognized as a transfer delay, required for transferring the contents stream data from the first broadcast apparatus to the second broadcast apparatus, and the second sync information generating means generates the second sync information based on the transfer delay value and the first time value contained in the first sync information in the attachment data provided from the first broadcast apparatus.

With the above construction, a receiver can correctly reproduce a program broadcast by the local station by reproducing the attachment data in synchronization with the image data since the local station generates the second sync information based on the transfer delay of the contents stream data, and replaces the first sync information with the second sync information.

In the above broadcast system, the contents stream data and the attachment data are transferred from the first broadcast apparatus to the second broadcast apparatus via different lines, the first sync information contains one of the first time values generated by the first time value attaching means, the first broadcast apparatus further includes a first time value transferring means for transferring the first time values generated by the first time value generating means to the second broadcast apparatus, and the second broadcast apparatus further includes: a first transfer delay value storing means for storing in advance a transfer delay value that indicates a time period, recognized as a first transfer delay, required for transferring the first time value from the first broadcast apparatus to the second broadcast apparatus; and a second transfer delay value storing means for storing in advance a transfer delay value that indicates a time period, recognized as a second transfer delay, required for transferring the contents stream data from the first broadcast apparatus to the second broadcast apparatus, and the second sync information generating means generates the second sync information based on the first and second transfer delay values and the first time value contained in the first sync information in the attachment data provided from the first broadcast apparatus.

With the above construction, a receiver can correctly reproduce a program broadcast by the local station by reproducing the attachment data in synchronization with the image data since the local station generates the second sync information based on the transfer delay of the contents stream data and the transfer delay of the first time value, and replaces the first sync information with the second sync information.

In the above broadcast system, the first sync information may contain (i) one of the first time values generated by the first time value generating means, (ii) a relative time value to the first time value, and (iii) a value indicating an increasing rate of the relative time value to the first time value, and both the first and second time values are repeatedly counted and generated in sequence in a range from a value "0" to an upper limit value, returning to 0 from the upper limit value, the first broadcast apparatus further includes a first time value transferring means for transferring the first time values to the second broadcast apparatus; the second broadcast apparatus further includes: a time values comparing means for comparing the first time value received from the first broadcast apparatus with a second time value generated by the second time value generating means when the first time value is detected; and a time period calculating means for, when the time values comparing means recognizes as a result of the comparison that the second time value is larger than the first time value, calculating a time period between the second time value and the upper limit value; a timer means for measuring time during the time period calculated by the time period calculating means; a third sync information generating means for, when the timer means measures time and reaches the upper limit value, generating third sync information indicating timing which corresponds to the timing indicated by the first sync information and with which the attachment data is to be reproduced in synchronization with the second encoded contents stream data having the second time values, and the second broadcast means digitally broadcasts (a) the attachment data additionally containing the third sync information and (b) the second encoded contents stream data with the second time values attached thereto.

With the above construction, a receiver can correctly reproduce a program broadcast by the local station by reproducing the attachment data in synchronization with the image data since the local station generates new sync information when a return-to-zero occurs, and additionally inserts the new sync information into the attachment data.

In the above broadcast system, each of the first and second broadcast apparatuses may have an encoder for encoding the contents stream data, the first sync information contains one of the first time values generated by the first time value attaching means, the first broadcast apparatus further includes: a first encode-delay value storing means for storing in advance a first encode-delay value that indicates a time period, recognized as a first encode-delay, required by the encoder of the first broadcast apparatus for encoding the contents stream data; and a third sync information generating means for generating third sync information based on a result of adding the first time value contained in the first sync information to the first encode-delay value, and the first broadcast means digitally broadcasts (a) the attachment data containing the third sync information and (b) the first encoded contents stream data with the first time values attached thereto, the second broadcast apparatus further includes: a second encode-delay value storing means for storing in advance a second encode-delay value that indicates a time period, recognized as a second encode-delay, required by the encoder of the second broadcast apparatus for encoding the contents stream data; and a difference value storing means for storing in advance a difference value between the first standard time and the second standard time, and the second sync information generating means generates the second sync information based on the difference value, the second encode-delay value, and the first time value contained in the first sync information in the attachment data provided from the first broadcast apparatus.

With the above construction, a receiver can correctly reproduce a program broadcast by the key or local station by reproducing the attachment data in synchronization with the image data since each broadcast station generates sync information taking into an encoding delay for contents stream data into account, and replaces old sync information with the new one. The above object is also achieved by a broadcast apparatus for digitally broadcasting a broadcast program that is provided from an external apparatus and includes encoded contents stream data and attachment data, the attachment data containing information that indicates timing with which the attachment data is to be reproduced in synchronization with the contents stream data, the broadcast apparatus comprising: a detecting means for detecting first sync information from the provided attachment data, the first sync information indicating, relative to one of first time values, timing with which the attachment data is to be reproduced in synchronization with a first encoded contents stream data having the first time values, the first time values indicating current times relative to a first standard time and having been sequentially attached to the first encoded contents stream data by the external apparatus; a time value generating means for sequentially generating second time values that indicate current times relative to a second standard time; a time value attaching means for sequentially attaching the generated second time values to a second encoded contents stream data generated by the broadcast apparatus by encoding the contents stream data; a sync information generating means for generating second sync information indicating timing which corresponds to the timing indicated by the first sync information and with which the attachment data is to be reproduced in synchronization with the second encoded contents stream data having the second time values; and a broadcast means for digitally broadcasting (a) the attachment data containing the second sync information instead of the first sync information and (b) the second encoded contents stream data with the second time values attached thereto.

With the above construction, when the external apparatus is provided in a key station, and the broadcast apparatus in a local station, and when the local station broadcasts a program composed of image data and attachment data supplied from the key station in digital broadcasting, a receiver can correctly reproduce the program broadcast by the local station by reproducing the attachment data in synchronization with the image data.

The above object is also achieved by a sync information replacing apparatus, comprising: a receiving means for receiving attachment data that contains first sync information indicating timing with which the attachment data is to be reproduced in synchronization with a first encoded contents stream data having first time values, the first time values indicating current times relative to a first standard time and having been sequentially attached to the first encoded contents stream data by an external apparatus; a detecting means for detecting the first sync information from the received attachment data; a sync information generating means for generating second sync information indicating timing which corresponds to the timing indicated by the first sync information and with which the attachment data is to be reproduced in synchronization with a second encoded contents stream data having second time values; and an outputting means for outputting the attachment data containing the second sync information instead of the first sync information.

With the above construction, when the sync information replacing apparatus is provided in a local station, and when the local station broadcasts a program composed of image data and attachment data supplied from the key station in digital broadcasting, a receiver can correctly reproduce the program broadcast by the local station by reproducing the attachment data in synchronization with the image data.

The above object is also achieved by a sync information replacing method, comprising: a receiving step for receiving attachment data that contains first sync information indicating timing with which the attachment data is to be reproduced in synchronization with a first encoded contents stream data having first time values, the first time values indicating current times relative to a first standard time and having been sequentially attached to the first encoded contents stream data by an external apparatus; a detecting step for detecting the first sync information from the received attachment data; a sync information generating step for generating second sync information indicating timing which corresponds to the timing indicated by the first sync information and with which the attachment data is to be reproduced in synchronization with a second encoded contents stream data having second time values; and an outputting step for outputting the attachment data containing the second sync information instead of the first sync information.

With the above construction, when the sync information replacing method is achieved in a local station, and when the local station broadcasts a program composed of image data and attachment data supplied from the key station in digital broadcasting, a receiver can correctly reproduce the program broadcast by the local station by reproducing the attachment data in synchronization with the image data.

The above object is also achieved by a program for causing a computer to execute a sync information replacing process, the sync information replacing process including: a receiving step for receiving attachment data that contains first sync information indicating timing with which the attachment data is to be reproduced in synchronization with a first encoded contents stream data having first time values, the first time values indicating current times relative to a first standard time and having been sequentially attached to the first encoded contents stream data by an external apparatus; an extracting step for extracting the first sync information from the received attachment data; a sync information generating step for generating second sync information indicating timing which corresponds to the timing indicated by the first sync information and with which the attachment data is to be reproduced in synchronization with a second encoded contents stream data having second time values; and an outputting step for outputting the attachment data containing the second sync information instead of the first sync information.

With the above construction, when the program causes a computer provided in a local station to execute the sync information replacing method, and when the local station broadcasts a program composed of image data and attachment data supplied from the key station in digital broadcasting, a receiver can correctly reproduce the program broadcast by the local station by reproducing the attachment data in synchronization with the image data.

The above object is also achieved by a recording medium in which a program for causing a computer to execute a sync information replacing process is recorded, the sync information replacing process including: a receiving step for receiving attachment data that contains first sync information indicating timing with which the attachment data is to be reproduced in synchronization with a first encoded contents stream data having first time values, the first time values indicating current times relative to a first standard time and having been sequentially attached to the first encoded contents stream data by an external apparatus; an extracting step for extracting the first sync information from the received attachment data; a sync information generating step for generating second sync information indicating timing which corresponds to the timing indicated by the first sync information and with which the attachment data is to be reproduced in synchronization with a second encoded contents stream data having second time values; and an outputting step for outputting the attachment data containing the second sync information instead of the first sync information.

With the above construction, when the program recorded in the recording medium causes a computer provided in a local station to execute the sync information replacing method, and when the local station broadcasts a program composed of image data and attachment data supplied from the key station in digital broadcasting, a receiver can correctly reproduce the program broadcast by the local station by reproducing the attachment data in synchronization with the image data.

BEST MODE FOR CARRYING OUT THE INVENTION

The following describes broadcast systems in Embodiments 1-6 of the present invention. Note that in these embodiments, it is supposed that the digital broadcasts conform to MPEG2-TS defined in the ISO/IEC13818. Note also that each broadcast program is composed of image data and attachment data. A first broadcast apparatus provides a second broadcast apparatus with a broadcast program, and these broadcast apparatuses broadcast the broadcast program substantially at the same time based on the absolute time.

Embodiment 1

The following describes Embodiment 1 of the present invention in detail with reference to the attached drawings. Note that in Embodiment 1, (a) the transfer delay that occurs when data is transferred, (b) the encoding delay that occurs when image data is encoded, and (c) "return-to-zero" which will be described in Embodiment 5 are not considered.

Construction 1

Figure 1:
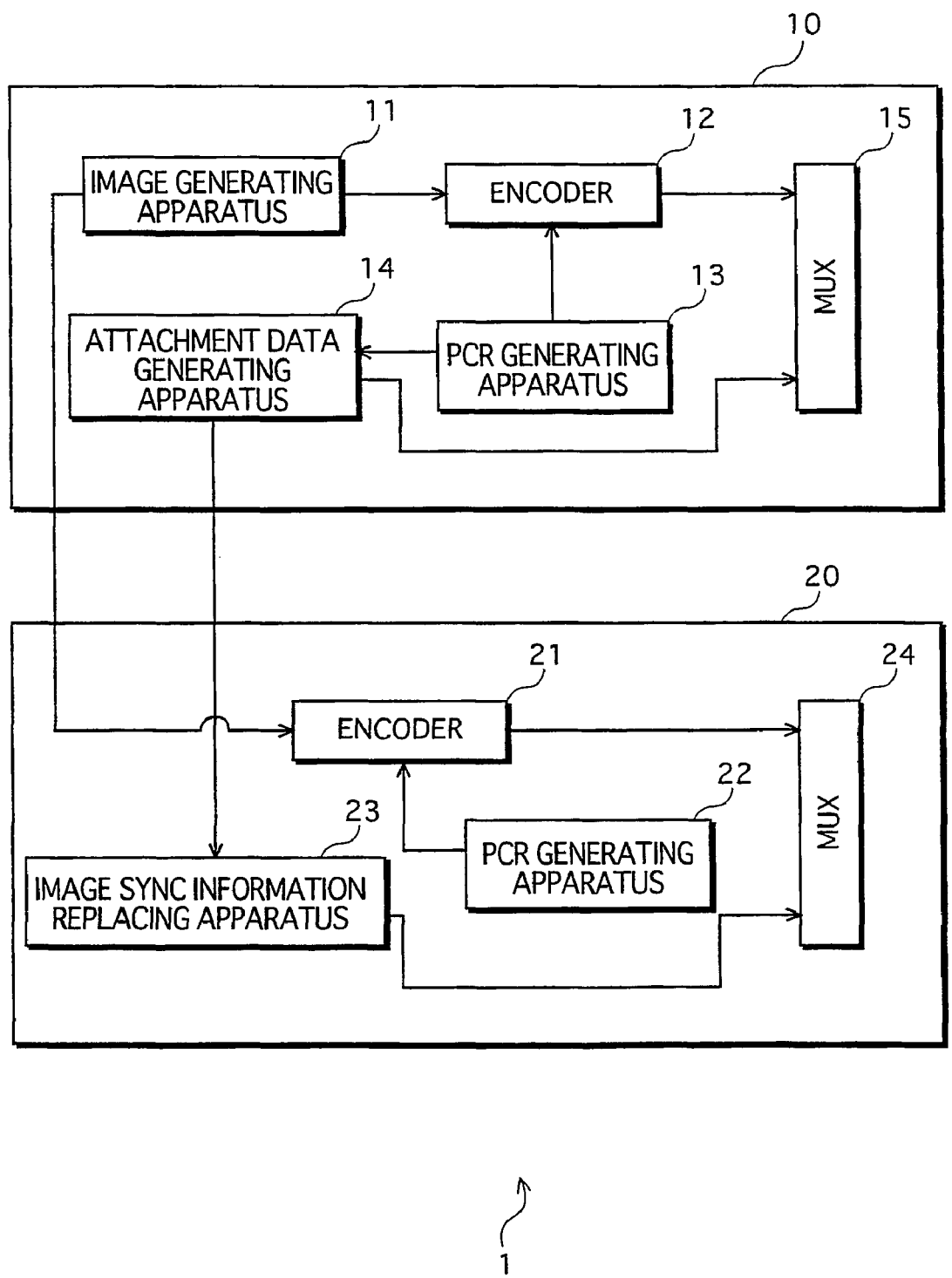
FIG. 1 shows the construction of the broadcast system in Embodiment 1.

FIG. 1 shows a main construction of a broadcast system 1 in Embodiment 1. The broadcast system 1 is composed of a first broadcast apparatus 10 and a second broadcast apparatus 20. The first broadcast apparatus 10 is situated in a broadcasting station such as a key station that provides broadcast programs. The second broadcast apparatus 20 is situated in a local station or the like that broadcast the provided broadcast programs. The first broadcast apparatus 10 is connected with the second broadcast apparatus 20 via a dedicated communication line. It should be noted here that there may be a plurality of first broadcast apparatuses 10 or a plurality of second broadcast apparatuses 20.

The broadcast system 1 is composed of a CPU, ROM, RAM, hard disk, decoder, filter or the like in terms of hardware, and a computer program is stored in the ROM or the hard disk, where each function of the system is achieved as a result of the CPU operation in accordance with the computer program. This also applies to Embodiments 2-5 which will be described later.

The first broadcast apparatuses 10 is composed of an image generating apparatus 11, an encoder 12, a PCR generating apparatus 13, an attachment data generating apparatus 14, and a multiplexing apparatus 15.

The image generating apparatus 11 has (a) a function to generate image data in the base band form, the DV format or the like from images captured by a digital video recorder or the like, and (b) a function to transfer the generated image data to the encoder 21 in the broadcast apparatus 20, as well as to the encoder 12.

The encoder 12 has (a) a function to encode the transferred image data into the MPEG2 format to generate image PESs, (b) a function to attach a PCR, as a DTS, to the initial image PES of an access unit, and (c) a function to divide the generated image PESs to TS packets. The TS packets are sequentially transferred to the multiplexing apparatus 15.

The PCR generating apparatus 13 counts values "0" to "$2^{33}-1$" based on the standard clock frequency of 90 KHz and sequentially sends the counted values as the PCR values to the encoder 12 and the attachment data generating apparatus 14. A standard time, a time when a counting of PCR values starts, is set for each broadcasting station. A predetermined standard time is also set in the PCR generating apparatus 13.

The attachment data generating apparatus 14 generates attachment data and outputs the generated attachment data, where the generated attachment data is for example character information written in the BML or the like and is to be displayed together with an image. The attachment data includes (a) image sync information that indicates the timing with which the attachment data is displayed in synchronization with the reproduction of the image data, and (b) receiver trigger information that indicates the timing with which the attachment data is displayed, as well as the information displayed together with an image. An STCR (System Time Clock Reference) is written in the image sync information. Note that hereinafter the STCR is referred to as the PCR since the STCR is equivalent to the PCR generated by the PCR generating apparatus 13. The attachment data is divided into TS packets. The TS packets are repeatedly transferred, as a stream, to the multiplexing apparatus 15 by the DSM-CC (Digital Storage Media Command and Control) method. The TS packets are also transferred to the second broadcast apparatus 20.

The multiplexing apparatus 15 multiplexes the TS packets sequentially transferred from the encoder 12 and the attachment data generating apparatus 14, into a transport stream by the time-division multiplex. The transport stream containing the multiplexed TS packets is digitally modulated by a modulator not illustrated, and is broadcast.

Now, the second broadcast apparatus will be described. The second broadcast apparatus is composed of an encoder 21, a PCR generating apparatus 22, an image sync information replacing apparatus 23, and a multiplexing apparatus 24.

The encoder 21 has the same function as the encoder 12 of the first broadcast apparatus 10.

The PCR generating apparatus 22 has the same function as the PCR generating apparatus 13 of the first broadcast apparatus 10. Note however that a standard time is set in the PCR generating apparatus 22, independent from the PCR generating apparatus 13.

The multiplexing apparatus 24 multiplexes the TS packets sequentially transferred from the encoder 21 and the image sync information replacing apparatus 23.

The image sync information replacing apparatus 23 receives the attachment data sequentially from the attachment data generating apparatus 14 of the first broadcast apparatus 10 and replaces the PCR written in the image sync information contained in the attachment data with a replacement PCR by executing an image sync information replacement process which will be described later. Now, the construction of the image sync information replacing apparatus 23 will be explained.

Figure 2:
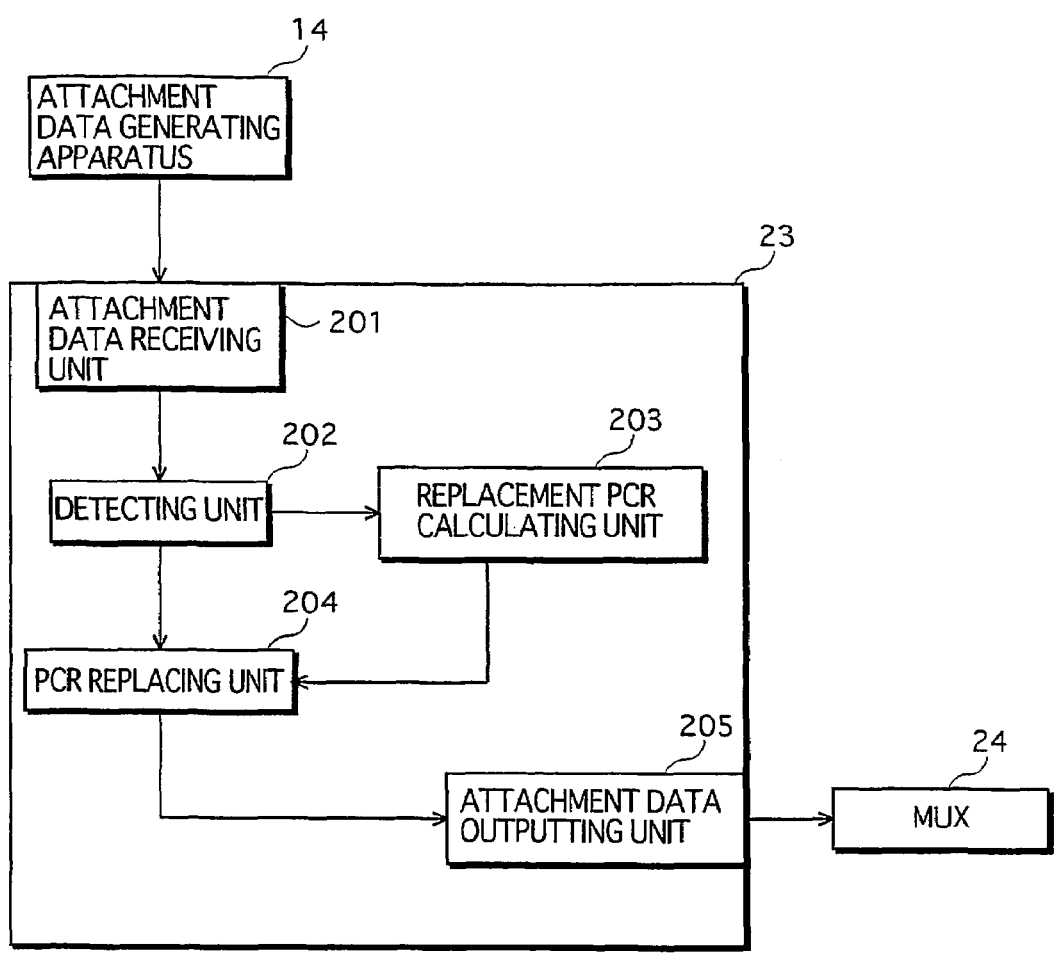
FIG. 2 is a block diagram showing the construction of the image sync information replacing apparatus in Embodiment 1.

FIG. 2 is a block diagram showing the construction of the image sync information replacing apparatus 23. The image sync information replacing apparatus 23 includes hardware such as a CPU and a memory and also includes functional units such as an attachment data receiving unit 201, a detecting unit 202, a replacement PCR calculating unit 203, a PCR replacing unit 204, and an attachment data outputting unit 205. Each function of the image sync information replacing apparatus 23 is achieved as a result of the CPU operation in accordance with the computer program. This also applies to the image sync information replacing apparatuses which will be described later in Embodiments 2-6.

The attachment data receiving unit 201 receives the attachment data sequentially from the attachment data generating apparatus 14 of the first broadcast apparatus 10. The attachment data receiving unit 201 transfers the received attachment data to the detecting unit 202.

The detecting unit 202 detects image sync information from the attachment data received by the attachment data receiving unit 201. The detecting unit 202 further reads a PCR written in the image sync information, and transfers the read PCR to the replacement PCR calculating unit 203.

The replacement PCR calculating unit 203 calculates a replacement PCR by adding the PCR received from the detecting unit 202 to a difference d0 that is held by the replacement PCR calculating unit 203 beforehand. Detailed operations of the replacement PCR calculating unit 203 will be described later. The calculated replacement PCR is transferred to the PCR replacing unit 204.

The PCR replacing unit 204 replaces the PCR in the image sync information with the replacement PCR transferred from the replacement PCR calculating unit 203.

The attachment data outputting unit 205 transfers the attachment data stream with the replacement PCR to the multiplexing apparatus 24.

Data 1

Figure 3:
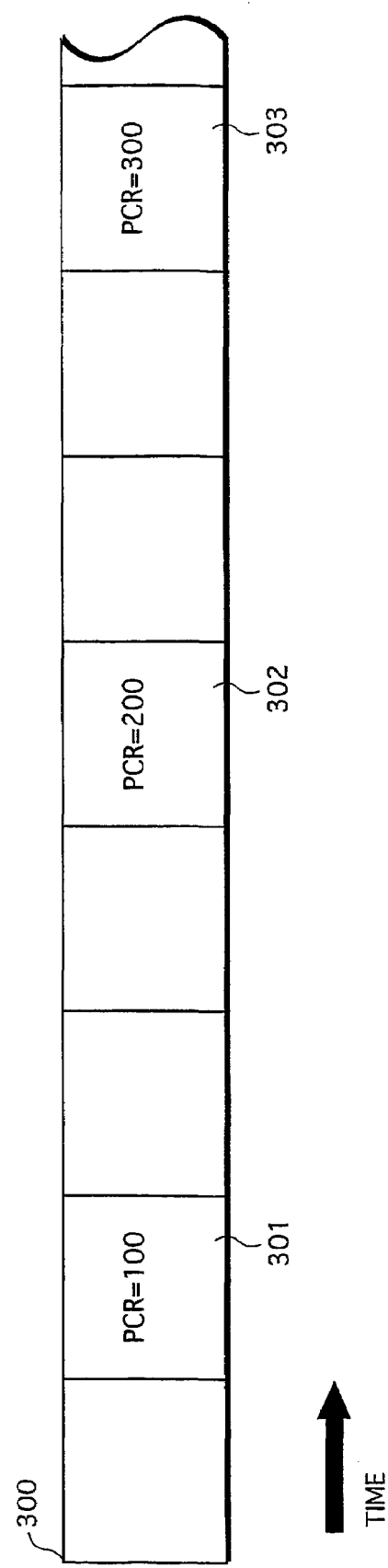
FIG. 3 shows an image PES stream encoded by the first broadcast apparatus that supplies broadcast programs.

FIG. 3 shows an image PES stream encoded by the encoder 12 of the first broadcast apparatus 10. The image PES stream is in reality a stream of TS packets making up the image PESs. Each box in the image PES stream 300 represents an image PES. A plurality of image PESs make up an access unit that is a unit of decoding/reproduction. A PCR, as a DTS, is attached to the initial image PES of an access unit. In this example shown in FIG. 3, image PESs 301, 302, and 303 are initial image PESs of respective access units.

Figure 4:
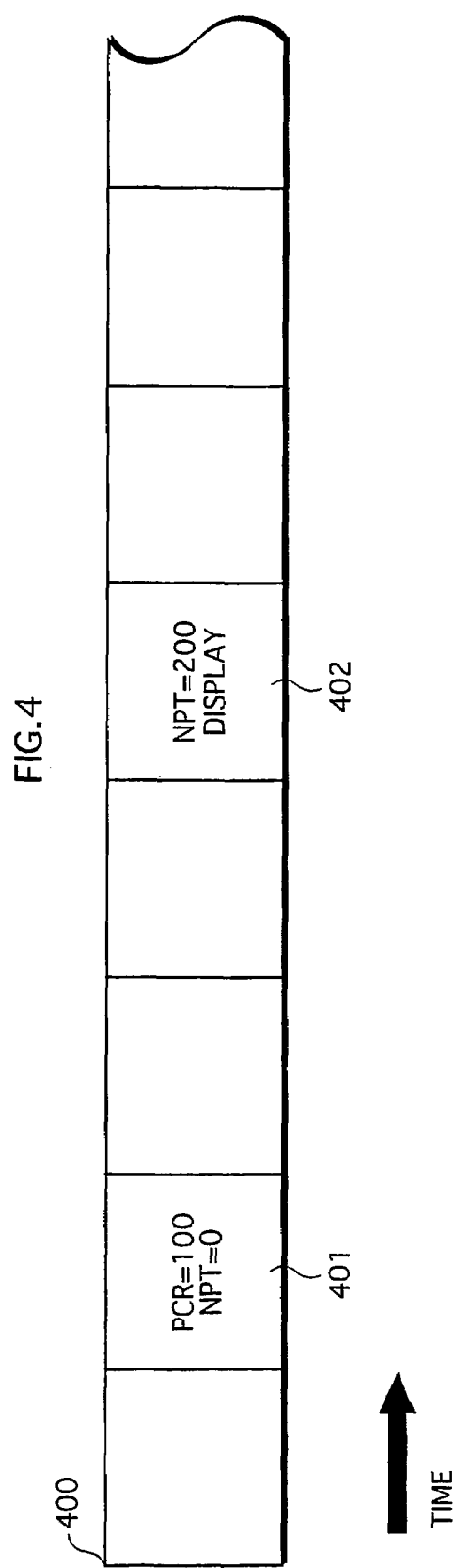
FIG. 4 shows an attachment data stream.

FIG. 4 shows an attachment data stream generated by the attachment data generating apparatus 14 of the first broadcast apparatus 10. Each box in the attachment data stream 400 represents a section that is a unit of transferring the attachment data. Note that in reality, the attachment data stream is a stream of TS packets making up the sections.

The section 401 contains image sync information, which in this example indicates that NPT=0 when PCR=100. The NPT (Normal Play Time) is a relative value to the PCR, and is used for a reproduction control of the attachment data.

The section 402 contains receiver trigger information that specifies the timing with which the characters, still pictures or the like contained in the attachment data are displayed, which in this example is NPT=200.

Figure 5:
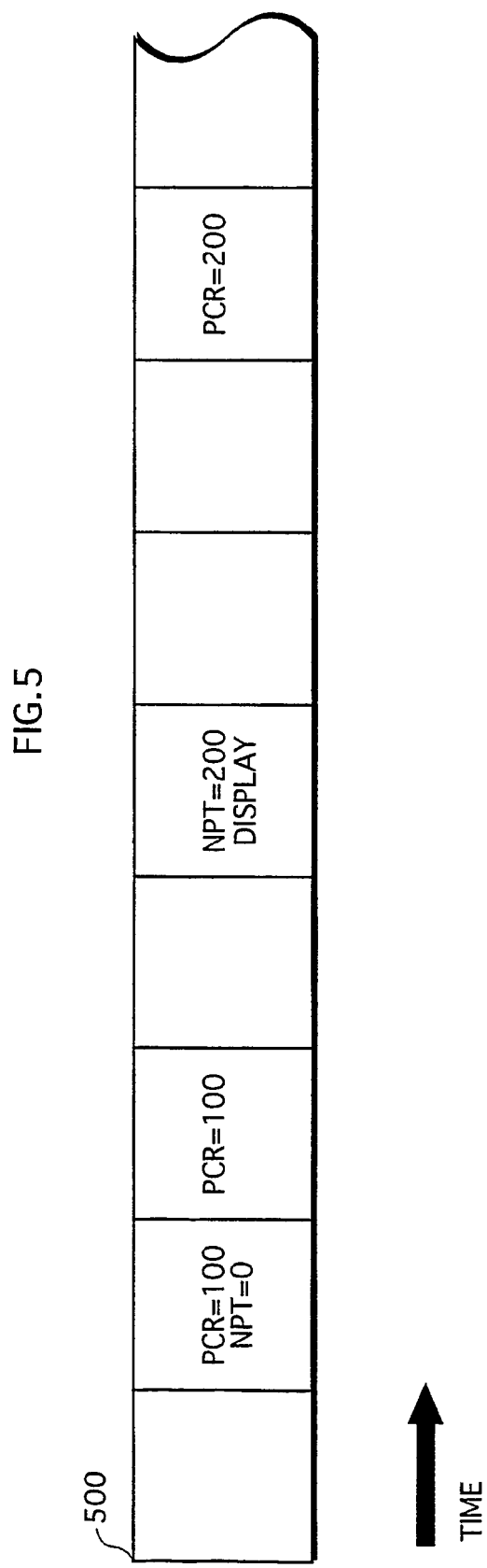
FIG. 5 shows a transport stream generated by the first broadcast apparatus that supplies broadcast programs.

FIG. 5 shows a transport stream generated by the multiplexing apparatus 15 of the first broadcast apparatus 10. Each box in the transport stream 500 represents a data unit such as a section, an image PES, etc. Note that in reality, the transport stream is a stream of TS packets making up the sections, image PESs or the like. The transport stream 500 is digitally modulated by a modulator of the first broadcast apparatus 10, and then broadcast. The broadcast transport stream 500 is demodulated by a receiver, where the data contained in the transport stream is recognized by the receiver in the flow of time shown in the FIG. 5.

The receiver refers to the PCR attached to the initial image PES of the access unit to recognize the time to start the access unit containing the referred image PES; the receiver refers to the image sync information to recognize the timing with which the reproduction of the image data is synchronized with the reproduction of the attachment data; and the receiver refers to the receiver trigger information contained in the attachment data to recognize the timing with which the characters, still pictures or the like contained in the attachment data are displayed. The receiver then displays the attachment data simultaneously with the reproduction of the image PES attached with the predetermined PCR, according to the image sync information.

The following is the description of the image data and the attachment data transferred from the first broadcast apparatus 10 to the second broadcast apparatus 20.

Figure 6:
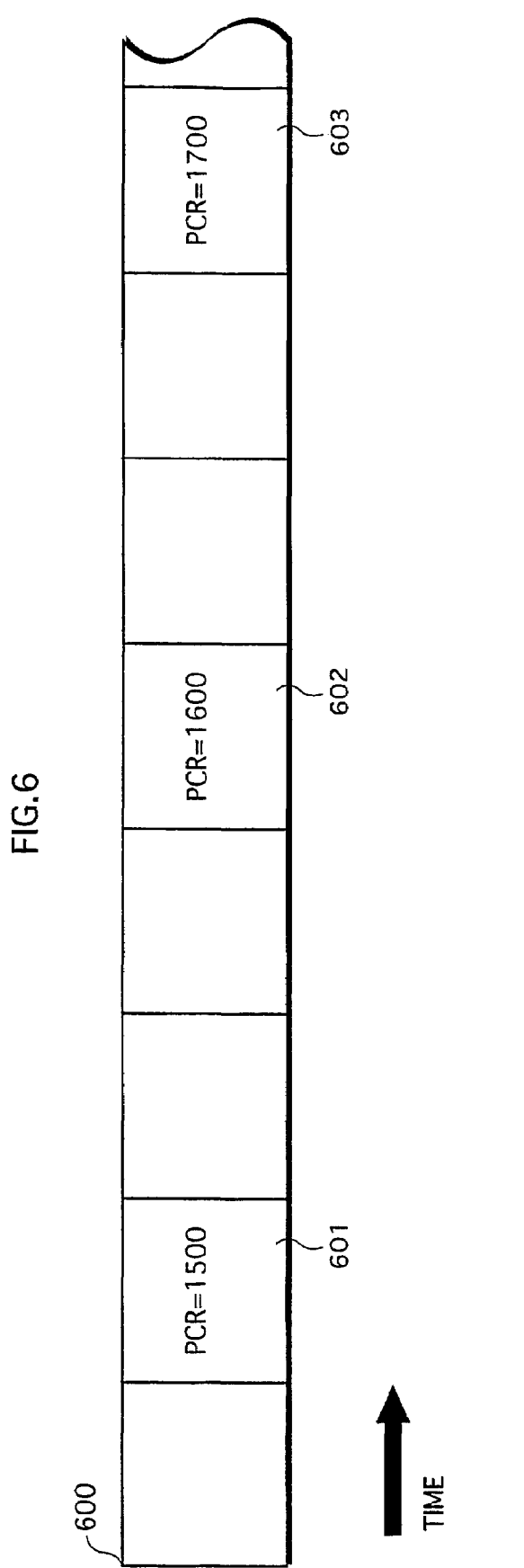
FIG. 6 shows an image PES stream encoded by the second broadcast apparatus that receives the supplied broadcast programs.

The image data transferred from the first broadcast apparatus 10 is encoded by the encoder 21 of the second broadcast apparatus 20 and image PESs are generated. FIG. 6 shows an image PES stream 600 generated as a result of encoding by the encoder 21. The image PES stream is in reality a stream of TS packets making up the image PESs. This image PES stream is different from that generated by the encoder 12 of the first broadcast apparatus 10 in that the PCR attached to the initial image PES of each access unit is a PCR sent from the PCR generating apparatus 22 of the second broadcast apparatus 20. In this example, as shown in FIG. 6, the initial image PESs 601, 602, and 603 of the access units in the image PES stream 600 have PCRs with values 1500, 1600, and 1700, respectively.

Figure 7:
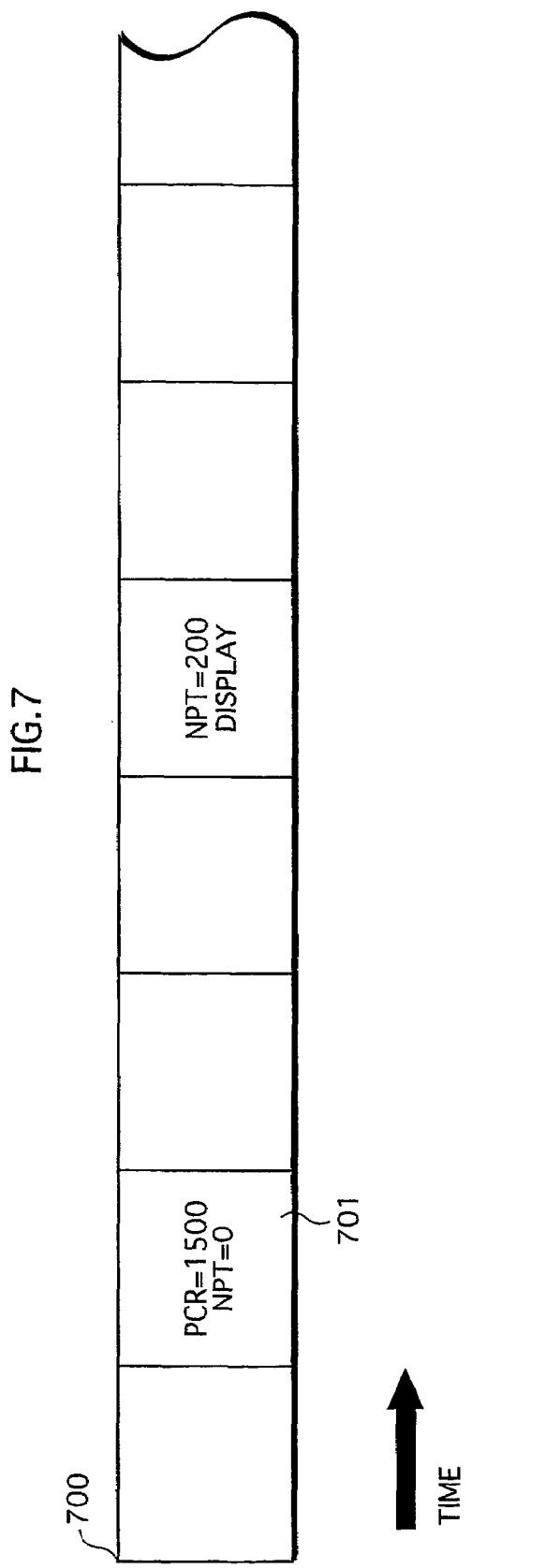
FIG. 7 shows the attachment data stream after the image sync information replacement process.

The attachment data stream transferred from the first broadcast apparatus 10 is subjected to the image sync information replacement process executed by the image sync information replacing apparatus 23 of the second broadcast apparatus 20. FIG. 7 shows the attachment data stream after the image sync information replacement process. The attachment data stream is in reality a stream of TS packets making up the sections. In this example, as shown in FIG. 7, the value of the PCR written in the image sync information in the section 701 has been changed from 100 to 1500 by the image sync information replacement process.

Figure 8:
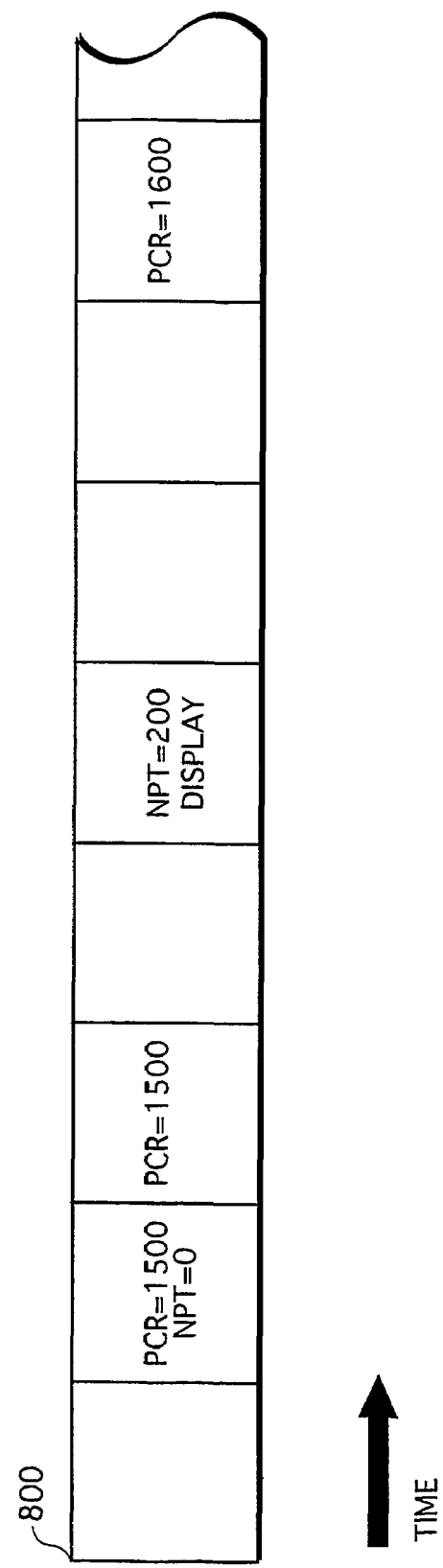
FIG. 8 shows a transport stream generated by the second broadcast apparatus that receives the supplied broadcast programs.

FIG. 8 shows a transport stream 800 generated by the multiplexing apparatus 24 of the second broadcast apparatus 20. A receiver receives the transport stream 800, and refers to the image sync information having the replacement PCR to recognize correct sync timing with which reproduction of an image PES having a PCR sent from the PCR generating apparatus 22 of the second broadcast apparatus 20 is synchronized with reproduction of the attachment data.

Operation 1

Figure 9:
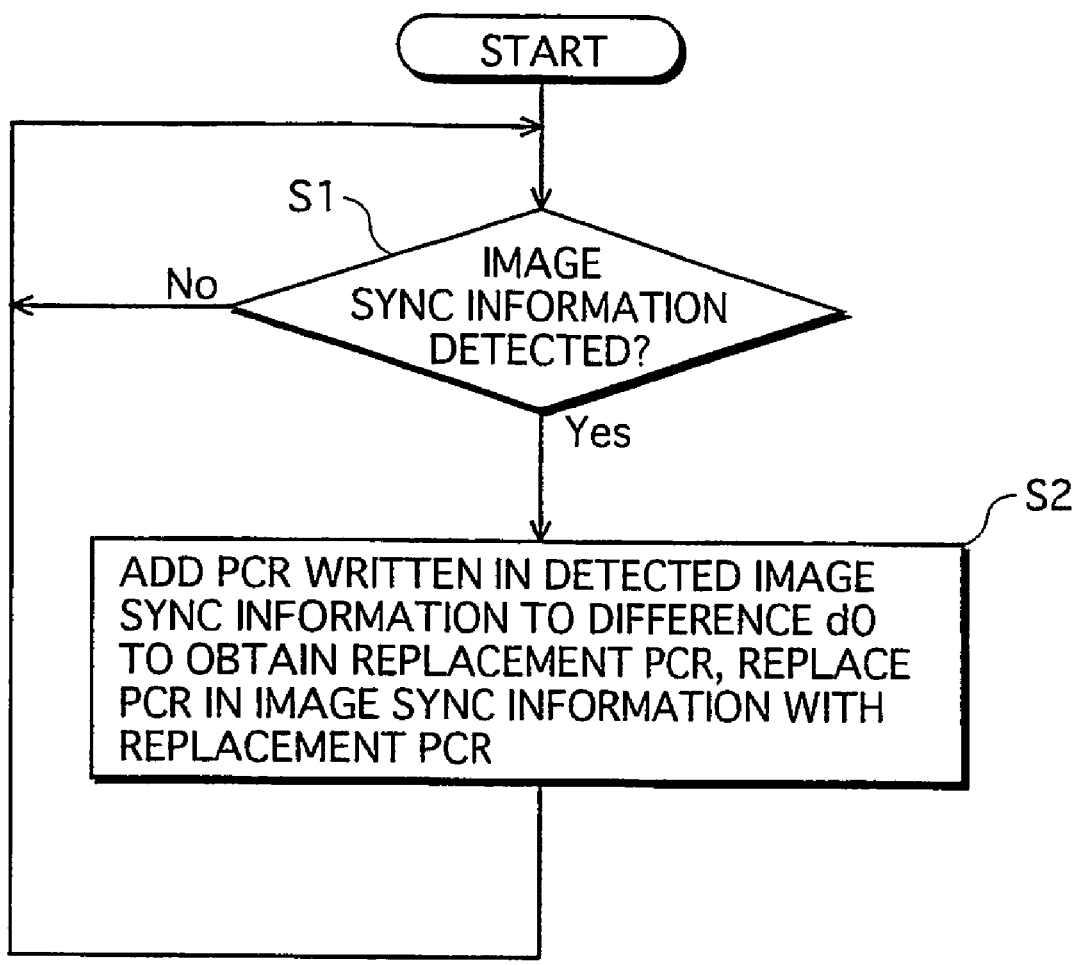
FIG. 9 is a flowchart showing the procedure of the image sync information replacement process in Embodiment 1.

The image sync information replacement process executed by the image sync information replacing apparatus 23 in Embodiment 1 will be described with reference to a flowchart. FIG. 9 is a flowchart showing the procedure of the image sync information replacement process in Embodiment 1.

First, in the image sync information replacing apparatus 23 shown in FIG. 2, when the detecting unit 202 detects the image sync information from the attachment data stream received by the attachment data receiving unit 201 (judged as "Yes" in step S1), the replacement PCR calculating unit 203 first adds a PCR written in the image sync information received from the detecting unit 202 to a difference d0 that is held by the replacement PCR calculating unit 203 beforehand, then performs a modular multiplication denoted as "X mod $2^{33}$" where X represents the result value of the addition. The result of the modular multiplication is transferred to the PCR replacing unit 204 as a replacement PCR. It should be noted here that the difference d0 is a difference, represented in terms of PCRS, between the standard time for the PCR generating apparatus 13 and the standard time for the PCR generating apparatus 22. Receiving the replacement PCR, the PCR replacing unit 204 replaces the PCR in the image sync information with the replacement PCR (step S2). After step S2 is completed, the control returns to step S1.

More specifically, in the image sync information replacing apparatus 23 shown in FIG. 2, when the detecting unit 202 detects the image sync information contained in the section 401 shown in FIG. 4, the detecting unit 202 reads the PCR (=100) and transfers the read PCR to the replacement PCR calculating unit 203. The replacement PCR calculating unit 203 adds the transferred PCR to the difference d0 that is held by the replacement PCR calculating unit 203 beforehand. If d0=1500, the addition result is 1500+100=1600. The replacement PCR calculating unit 203 then performs a modular multiplication "1600 mod $2^{33}$", and transfers the result value of the addition. The result of the modular multiplication to the PCR replacing unit 204 as a replacement PCR. In this example, the PCR replacing unit 204 replaces the PCR value "200" with "1600" in the image sync information contained in the section 401.

Embodiment 2

Embodiment 2 of the present invention is almost the same as Embodiment 1 in terms of the construction and data. Accordingly, only differences will be described here. Note that in Embodiment 2, as is the case with Embodiment 1, (a) the transfer delay that occurs when data is transferred, (b) the encoding delay that occurs when image data is encoded, and (c) "return-to-zero" which will be described in Embodiment 5 are not considered.

In the broadcast system in Embodiment 2, the first broadcast apparatus being a broadcast program provider further attaches to the attachment data a standard PCR which is a PCR generated by the PCR generating apparatus of the first broadcast apparatus. Also, the second broadcast apparatus being a broadcast program receiver calculates a difference d1 between the received standard PCR and a PCR generated by the PCR generating apparatus of the second broadcast apparatus, and stores the calculated difference d1. The second broadcast apparatus then reads a PCR written in the image sync information contained in the attachment data, calculates a replacement PCR by adding the read PCR to the difference d1, and replaces the PCR in the image sync information with the calculated replacement PCR.

Construction 2

Figure 10:
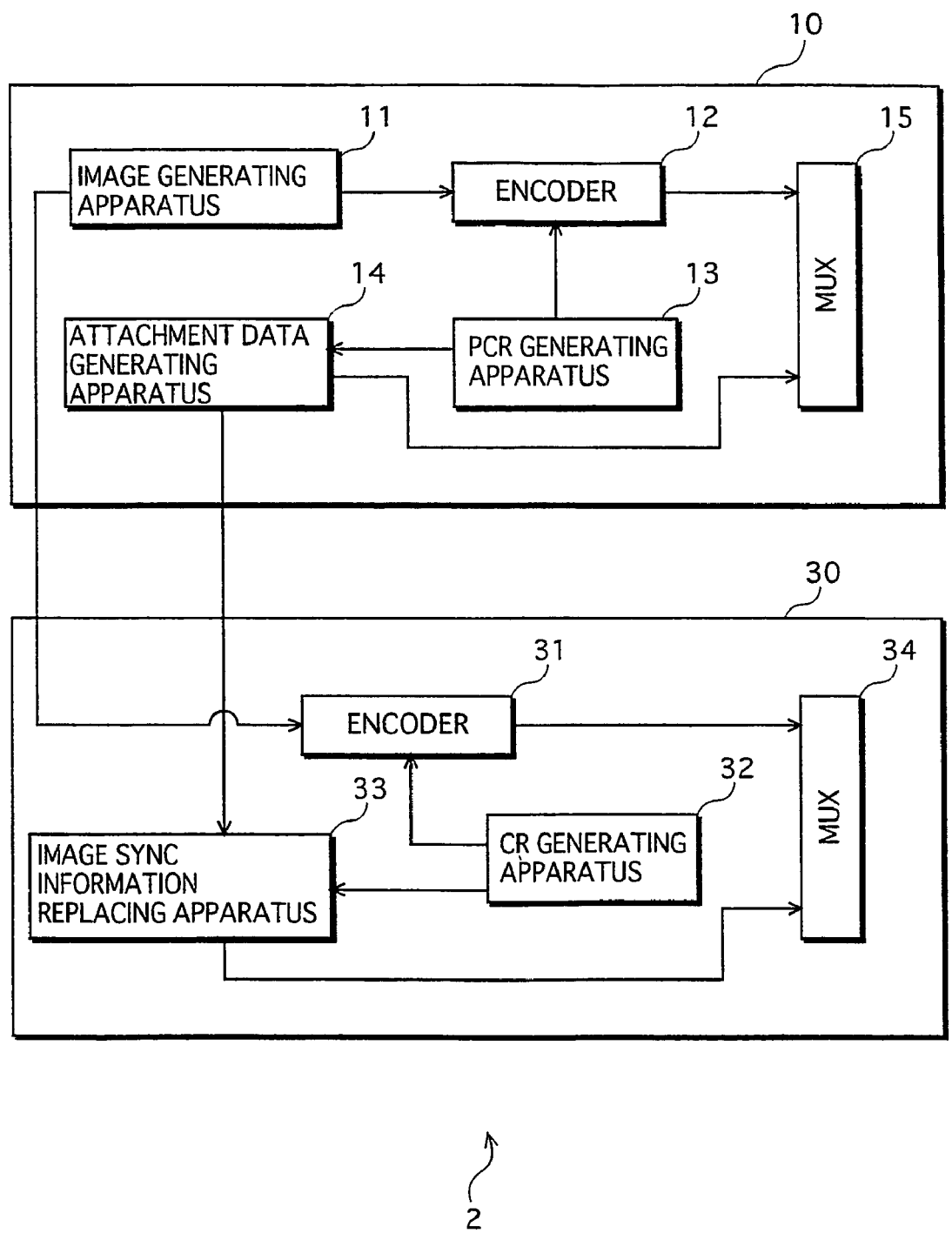
FIG. 10 shows the construction of the broadcast system in Embodiment 2.

The broadcast system 2 shown in FIG. 10 is different from the broadcast system 1 in Embodiment 1 in that the PCR generated by the PCR generating apparatus 13 is attached to the attachment data stream as the standard PCR, and that the image sync information replacing apparatus 33 of the second broadcast apparatus 30 sequentially receives PCRs generated by the PCR generating apparatus 32.

Figure 11:
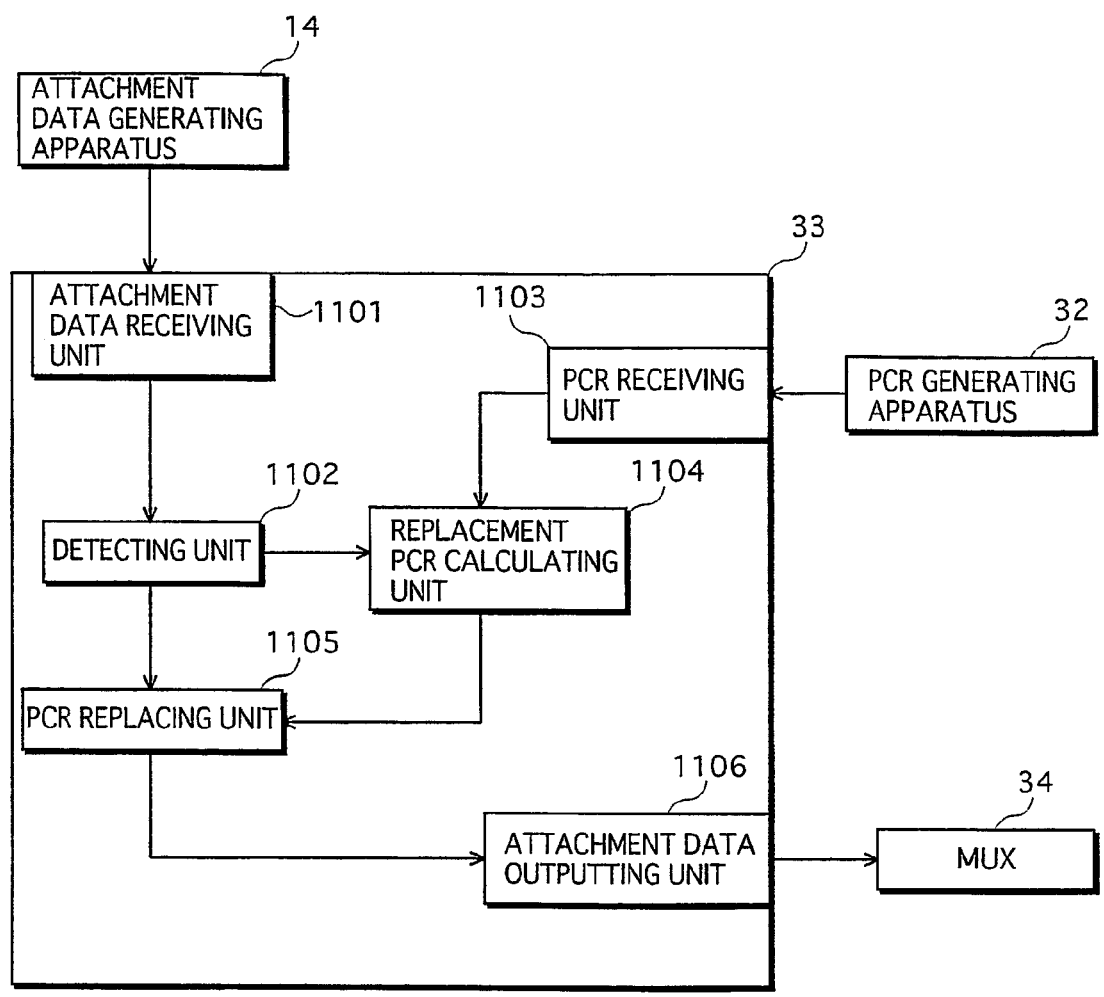
FIG. 11 is a functional block diagram showing the construction of the image sync information replacing apparatus in Embodiment 2.

FIG. 11 is a functional block diagram showing the construction of the image sync information replacing apparatus 33.

A detecting unit 1102 detects the standard PCR and the image sync information from the attachment data stream received by a PCR receiving unit 1101. The detecting unit 1102 also reads the detected standard PCR and transfers the read standard PCR to the replacement PCR calculating unit 1104. When detecting the image sync information, the detecting unit 1102 reads the PCR from the image sync information and transfers the read PCR to the replacement PCR calculating unit 1104.

The PCR receiving unit 1103 sequentially receives PCRs transferred from the PCR generating apparatus 32, and sequentially transfers the received PCRs to the replacement PCR calculating unit 1104.

The replacement PCR calculating unit 1104 calculates a difference d1 between the standard PCR read by the detecting unit 1102 and the PCR received by the PCR receiving unit 1103 and stores the calculated difference d1. The replacement PCR calculating unit 1104 also calculates a replacement PCR by adding the difference d1 to the PCR written in the image sync information read by the detecting unit 1102. The calculated replacement PCR is sent to the PCR replacing unit 1105.

Data 2

The only difference from Embodiment 1 is that the standard PCR is attached to the attachment data stream.

Figure 12:
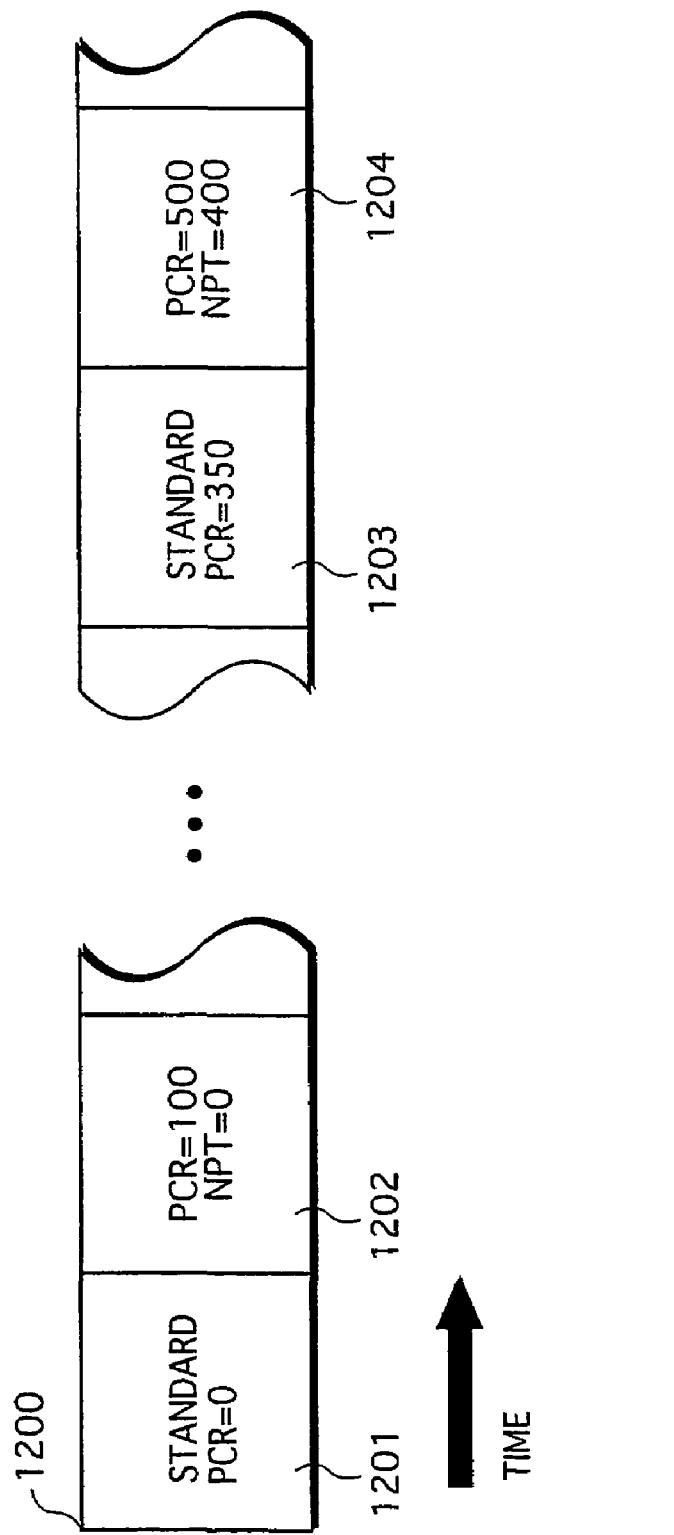
FIG. 12 shows the attachment data stream generated by the attachment data generating apparatus 14 of the first broadcast apparatus 10.

FIG. 12 shows the attachment data stream generated by the attachment data generating apparatus 14 of the first broadcast apparatus 10. The attachment data stream 1200 contains a packet 1201 and a packet 1203 both containing the standard PCR. The packets 1201 and 1203 containing the standard PCR are positioned immediately before the sections 1202 and 1204 containing the image sync information, respectively.

Operation 2

Figure 13:
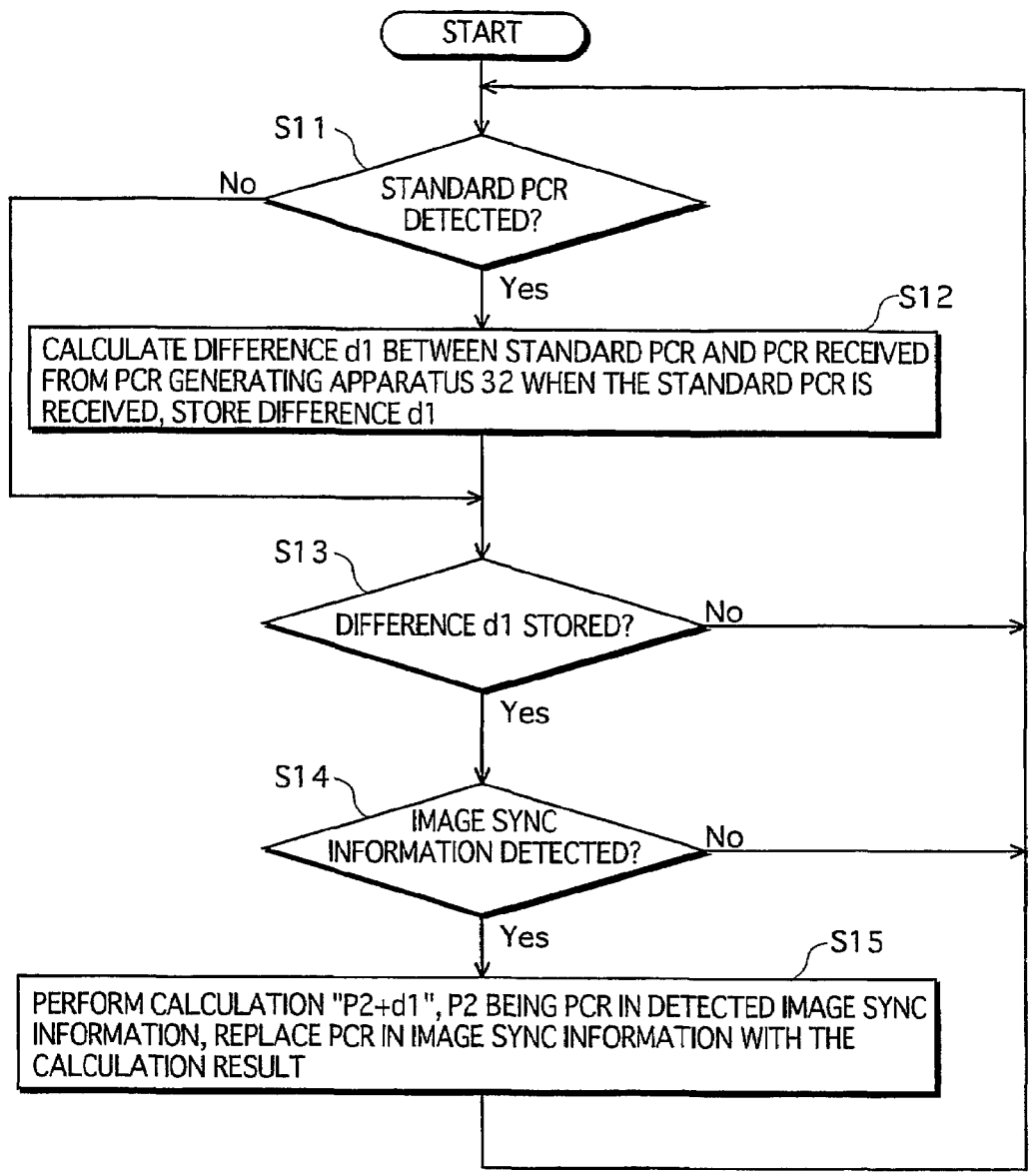
FIG. 13 is a flowchart showing the procedure of the image sync information replacement process in Embodiment 2.

The image sync information replacement process executed by the image sync information replacing apparatus 33 in Embodiment 2 will be described with reference to a flowchart. FIG. 13 is a flowchart showing the procedure of the image sync information replacement process in Embodiment 2.

First, in the image sync information replacing apparatus 33 shown in FIG. 11, when the detecting unit 1102 detects the standard PCR from the attachment data stream received by the attachment data receiving unit 1101 (judged as "Yes" in step S11), the replacement PCR calculating unit 1104 receives the standard PCR from the detecting unit 1102, calculates a difference d1 between the standard PCR and the PCR received by the PCR receiving unit 1103 and stores the calculated difference d1 (step S12).

When it is judged that the standard PCR is not detected (judged as "No" in step S11), the control skips to step S13.

In step S13, it is judged whether the difference d1 is stored: if stored (judged as "Yes" in step S13), the control goes to step S14; and if not stored (judged as "No" in step S13), the control returns to step S11.

When the detecting unit 1102 detects the image sync information (judged as "Yes" in step S14), the replacement PCR calculating unit 1104 receives from the detecting unit 1102 a PCR read by the detecting unit 1102 from the image sync information, adds the received PCR to the difference d1 as denoted by an expression "P2+d1", where P2 represents the received PCR, and performs a modular multiplication denoted as "X mod $2^{33}$" where X represents the result value of the addition. The replacement PCR calculating unit 1104 transfers the result of the modular multiplication to the PCR replacing unit 1105 as a replacement PCR. Receiving the replacement PCR, the PCR replacing unit 1105 replaces the PCR in the image sync information with the replacement PCR (step S15), and returns to step S11.

When the detecting unit 1102 does not detect the image sync information (judged as "No" in step S14), the control returns to step S11.

More particularly, in the image sync information replacing apparatus 33 shown in FIG. 11, when the replacement PCR calculating unit 1104 receives the standard PCR (=0) contained in the section 1201 shown in FIG. 12, and when the PCR transferred from the PCR receiving unit 1103 is "5000", the difference d1 calculated by the replacement PCR calculating unit 1104 is "5000". Then when the PCR written in the image sync information detected later is "100", the replacement PCR calculating unit 1104 adds the received PCR (100) to the difference d1 (5000), and performs a modular multiplication denoted "5100 mod $2^{33}$", where "5100" is the result value of the addition. The replacement PCR calculating unit 1104 transfers the result (5100) of the modular multiplication to the PCR replacing unit 1105 as a replacement PCR. Receiving the replacement PCR, the PCR replacing unit 1105 replaces the PCR (100) in the image sync information with the replacement PCR (5100).

Embodiment 3

Embodiment 3 of the present invention is almost the same as Embodiment 1 in terms of the construction and data. Accordingly, only differences will be described here. Note that in Embodiment 3, as is the case with Embodiment 1, (a) the transfer delay that occurs when data is transferred, (b) the encoding delay that occurs when image data is encoded, and (c) "return-to-zero" which will be described in Embodiment 5 are not considered.

In the broadcast system in Embodiment 3, the second broadcast apparatus being a broadcast program receiver further includes a program start trigger generating apparatus. When the program start trigger generating apparatus generates and notifies a program start trigger, the image sync information replacing apparatus in Embodiment 3 calculates a PCR that is N seconds after the standard time of a PCR sent from the PCR generating apparatus in the second broadcast apparatus, and stores the calculated PCR as a program start PCR, and replaces the PCR in the image sync information having the NPT value of "0" with the program start PCR. The image sync information replacing apparatus in Embodiment 3 also calculates a difference d between the program start PCR and the PCR written in the image sync information having the NPT value of "0", and stores the difference d which is used in calculating a replacement PCR to replace a PCR in the image sync information transferred later. Note that the above feature of Embodiment 3 is based on the premise that the second broadcast apparatus receives the image sync information having the NPT value of "0", which indicates a program start time, from the first broadcast apparatus.

Construction 3

Figure 14:
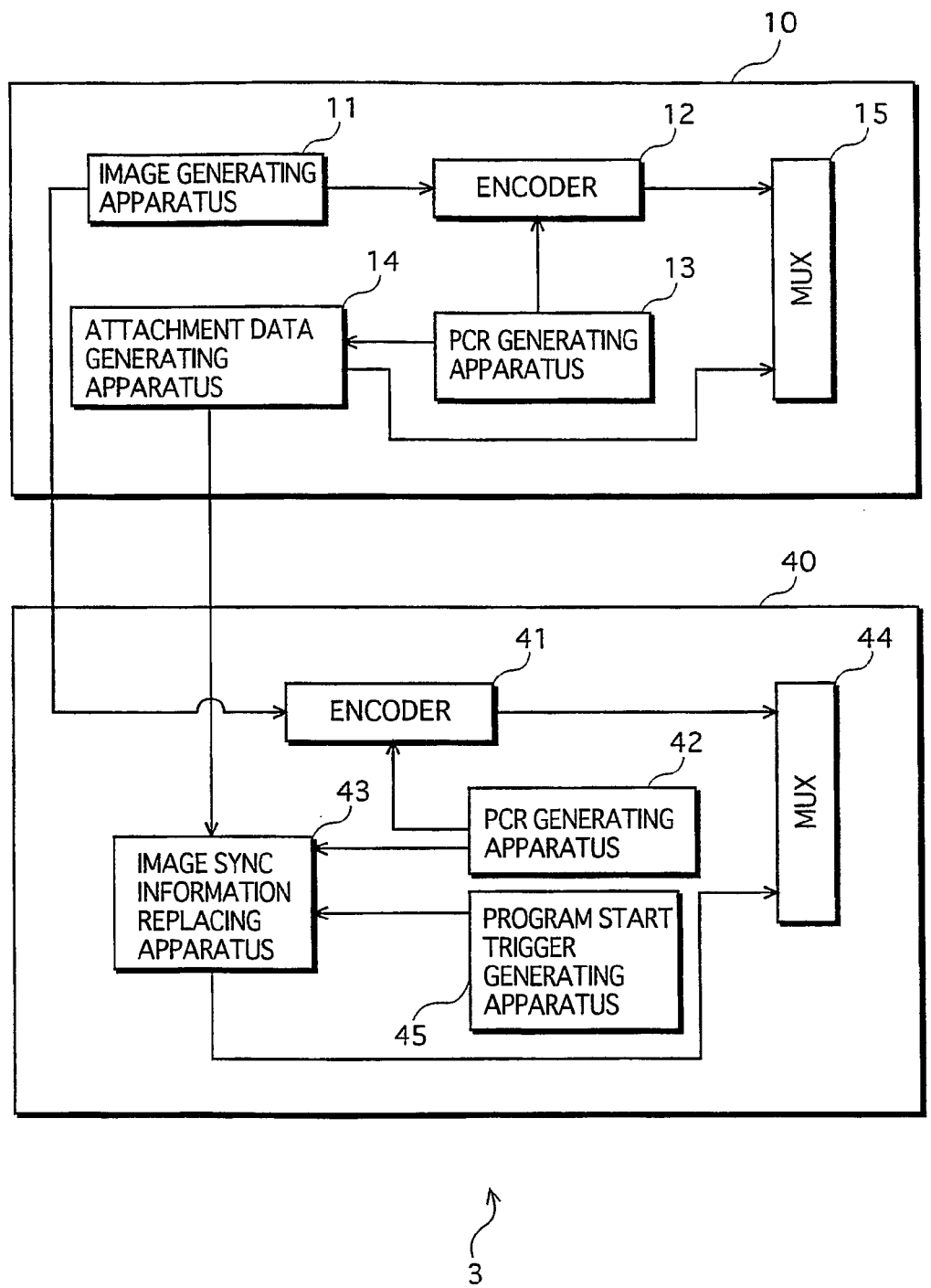
FIG. 14 shows the construction of the broadcast system in Embodiment 3.

The broadcast system 3 shown in FIG. 14 is different from the broadcast system 1 in Embodiment 1 in that the program start time in the second broadcast apparatus 40 is calculated based on the time when the program start trigger generating apparatus 45 generates a program start trigger.

The program start trigger generating apparatus 45 generates a program start trigger that notifies a program start a predetermined time period before the program start. For example, the program start trigger indicates that a broadcast program starts 5 seconds later. The program start trigger is sent to the image sync information replacing apparatus 43.

Figure 15:
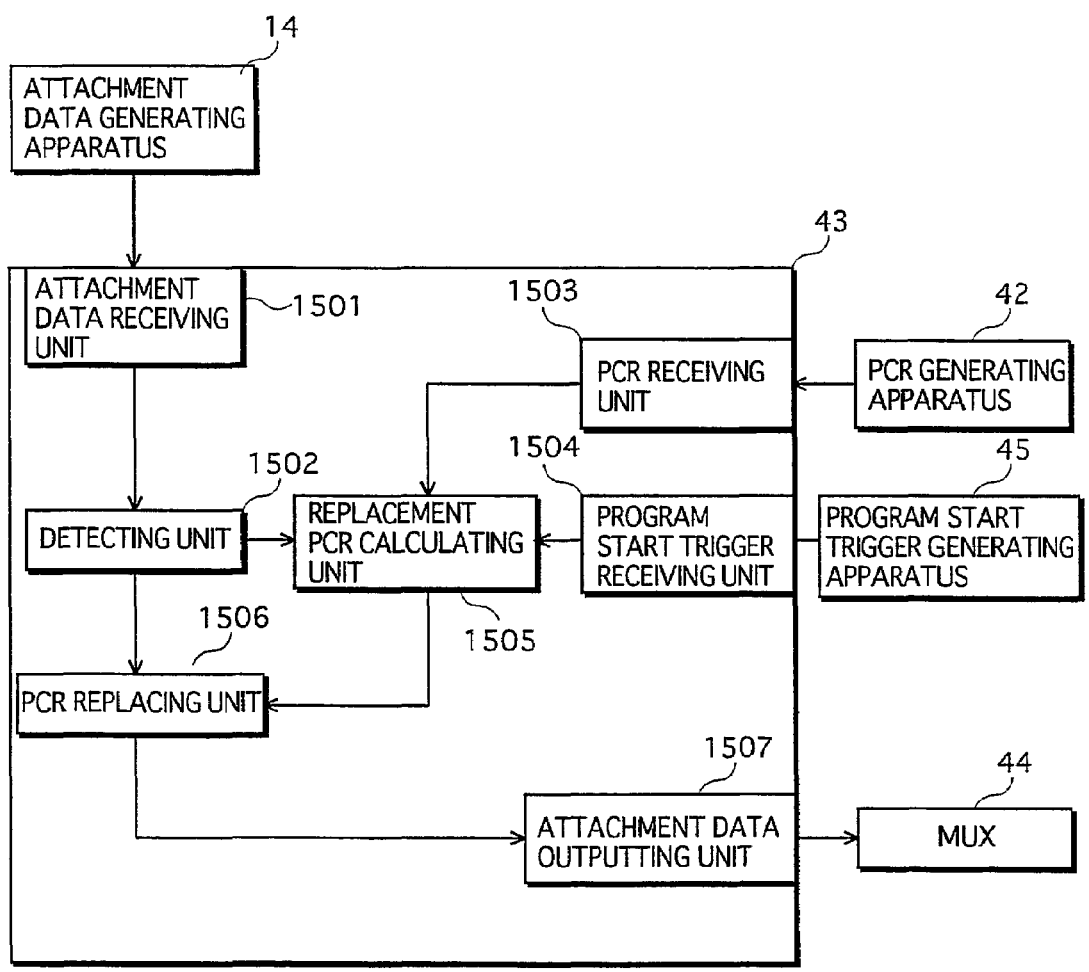
FIG. 15 is a functional block diagram showing the construction of the image sync information replacing apparatus in Embodiment 3.

FIG. 15 is a functional block diagram showing the construction of the image sync information replacing apparatus 43.

A detecting unit 1502 detects the image sync information from attachment data stream received by the attachment receiving unit 1501. When it detects the image sync information, the detecting unit 1502 reads the PCR and NPT written in the image sync information, and transfers the read PCR and NPT to the PCR calculating unit 1505.

The PCR receiving unit 1503 sequentially receives PCRs transferred from the PCR generating apparatus 42, and sequentially transfers the received PCRs to the replacement PCR calculating unit 1505.

The program start trigger receiving unit 1504 receives the program start trigger generated by the program start trigger generating apparatus 45, and transfers the program start trigger to the replacement PCR calculating unit 1505.

The replacement PCR calculating unit 1505 has (a) a function to calculate, when it receives a program start trigger that indicates that a broadcast program starts N seconds later, where N is a positive value, a PCR that indicates a time N seconds after the PCR received by the PCR receiving unit 1503, and store the calculated PCR as the program start PCR, (b) a function to transfer the program start PCR to the replacing unit 1506 when the NPT contained in the image sync information detected by the detecting unit 1502 is "0" and perform a calculation "P3−P2", where P3 represents the program start PCR and P2 represents the PCR written in the image sync information having the NPT value of "0", and store the calculation result as a difference d, and (c) a function to add the difference d to the PCR written in the image sync information to calculate a replacement PCR when the NPT value of the image sync information detected by the detecting unit 1502 is not "0". The calculated replacement PCR is transferred to the PCR replacing unit 1506.

Operation 3

Figure 16:
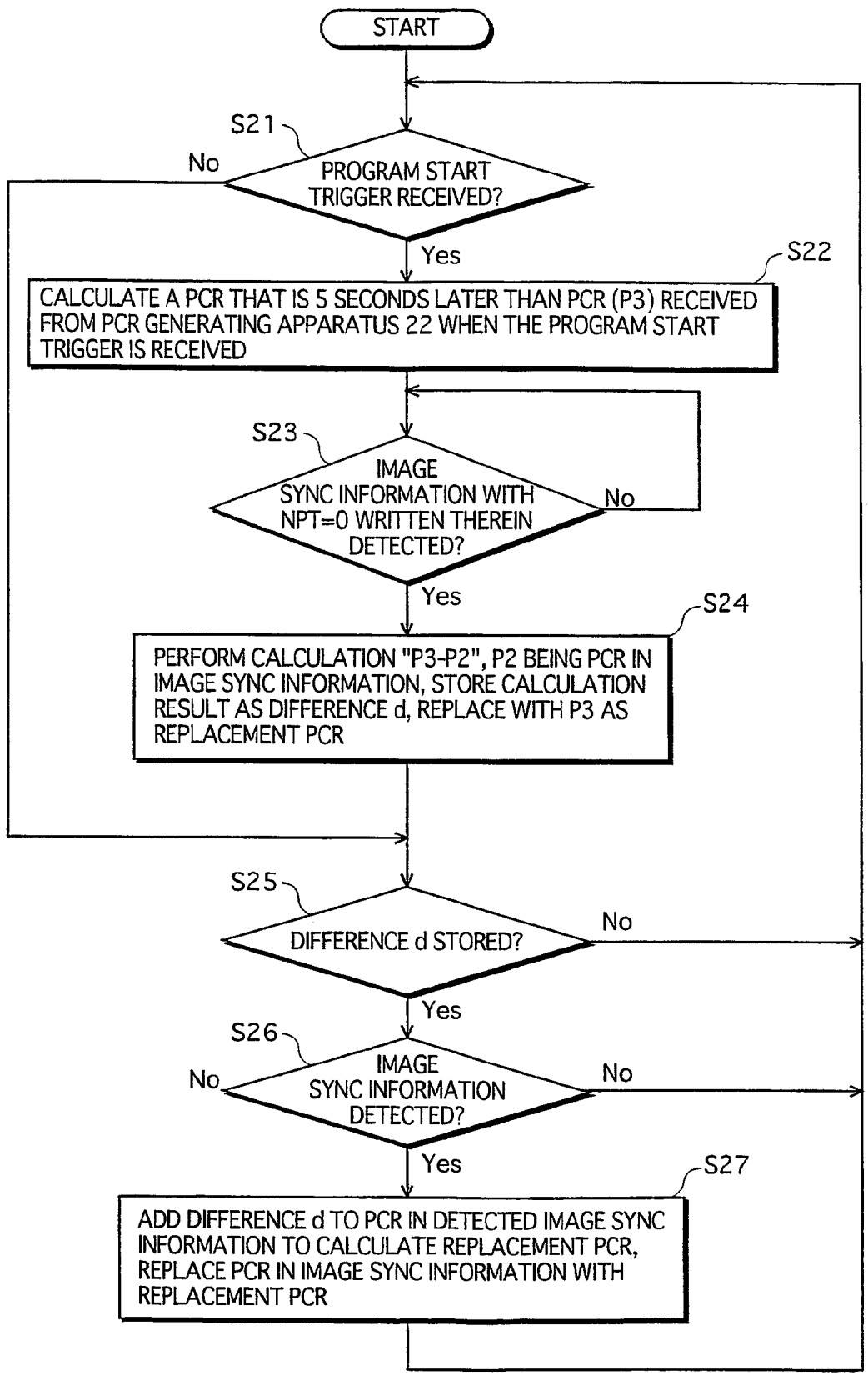
FIG. 16 is a flowchart showing the procedure of the image sync information replacement process in Embodiment 3.

The image sync information replacement process executed by the image sync information replacing apparatus 43 in Embodiment 3 will be described with reference to a flowchart. FIG. 16 is a flowchart showing the procedure of the image sync information replacement process in Embodiment 3. It is presumed in this flowchart that a program starts 5 seconds after a program start trigger is generated.

First, in the image sync information replacing apparatus 43 shown in FIG. 15, if the program start trigger receiving unit 1504 receives the program start trigger (judged as "Yes" in step S21), the control goes to step S22 in which the replacement PCR calculating unit 1505 receives the program start trigger from the program start trigger receiving unit 1504, calculates a PCR that is 5 seconds after the PCR received by the PCR receiving unit 1503, and stores the calculated PCR as the program start PCR (step S22). The control then goes to step S23. More specifically, since MPEG2 defines that the PCR value increases every 1/90,000 seconds by "1", the increase in the PCR value during 5 seconds is calculated as 90,000× 5=450,000. Accordingly, if the PCR received by the PCR receiving unit 1503 has a value of "100" when the replacement PCR calculating unit 1505 receives the program start trigger, the program start PCR is calculated as 100+450, 000=450,100.

When the program start trigger receiving unit 1504 does not receive the program start trigger (judged as "No" in step S21), the control skips to step S25.

If the detecting unit 1502 detects the image sync information with NPT=0 written therein (judged as "Yes" in step S23), the control goes to step S24 in which the replacement PCR calculating unit 1505 performs a calculation "P3−P2", where P3 represents the program start PCR and P2 represents the PCR written in the image sync information having the NPT value of "0", stores the calculation result as a difference d, and transfers the program start PCR to the PCR replacing unit 1506. The PCR replacing unit 1506 receives the program start PCR and replaces the PCR in the image sync information having the NPT value of "0" with the received program start PCR (step S24).

If it is judged that the difference d is stored in step S25 (judged as "Yes" in step S25), the control goes to step S26. If it is judged that the difference d is not stored in step S25 (judged as "No"), the control returns to step S21.

If it is judged in step S26 that the detecting unit 1502 has detected the image sync information (judged as "Yes" in step S26), the control goes to step S27 in which the replacement PCR calculating unit 1505 adds the difference d to the PCR written in the detected image sync information to calculate a replacement PCR and transfers the calculated replacement PCR to the PCR replacing unit 1506. The PCR replacing unit 1506 receives the replacement PCR and replaces the PCR in the detected image sync information with the replacement PCR (step S27). The control then returns to step S21.

If it is judged in step S26 that the detecting unit 1502 has not detected the image sync information (judged as "No" in step S26), the control returns to step S21.

Embodiment 4

Embodiment 4 of the present invention is almost the same as Embodiment 1 in terms of the construction and data. Accordingly, only differences will be described here. Note that in Embodiment 4, as is the case with Embodiment 1, (a) the transfer delay that occurs when data is transferred, (b) the encoding delay that occurs when image data is encoded, and (c) "return-to-zero" which will be described in Embodiment 5 are not considered.

In the broadcast system in Embodiment 4, the second broadcast apparatus sequentially receives PCRs as standard PCRs from a PCR generating apparatus of the first broadcast apparatus being a broadcast program provider, via a dedicated line. In Embodiment 2, standard PCRs are attached to the attachment data stream and transferred together with the attachment data stream. In contrast, in Embodiment 4, standard PCRs are transferred via a dedicated line. Receiving a standard PCR, the second broadcast apparatus calculates a difference d2 using (i) a PCR that is generated by a PCR generating apparatus of the second broadcast apparatus simultaneously as the standard PCR is received, (ii) the received standard PCR, and (iii) a transfer delay time indicating a time period required to transfer a standard PCR, and stores the calculated difference. The second broadcast apparatus also calculates a replacement PCR using (i) a PCR written in the image sync information contained in the received attachment data, (ii) the difference d2, and (iii) a transfer delay time that indicates a time period required to transfer image data and is stored in a memory before hand. The PCR written in the image sync information is replaced with the calculated replacement PCR.

Construction 4

Figure 17:
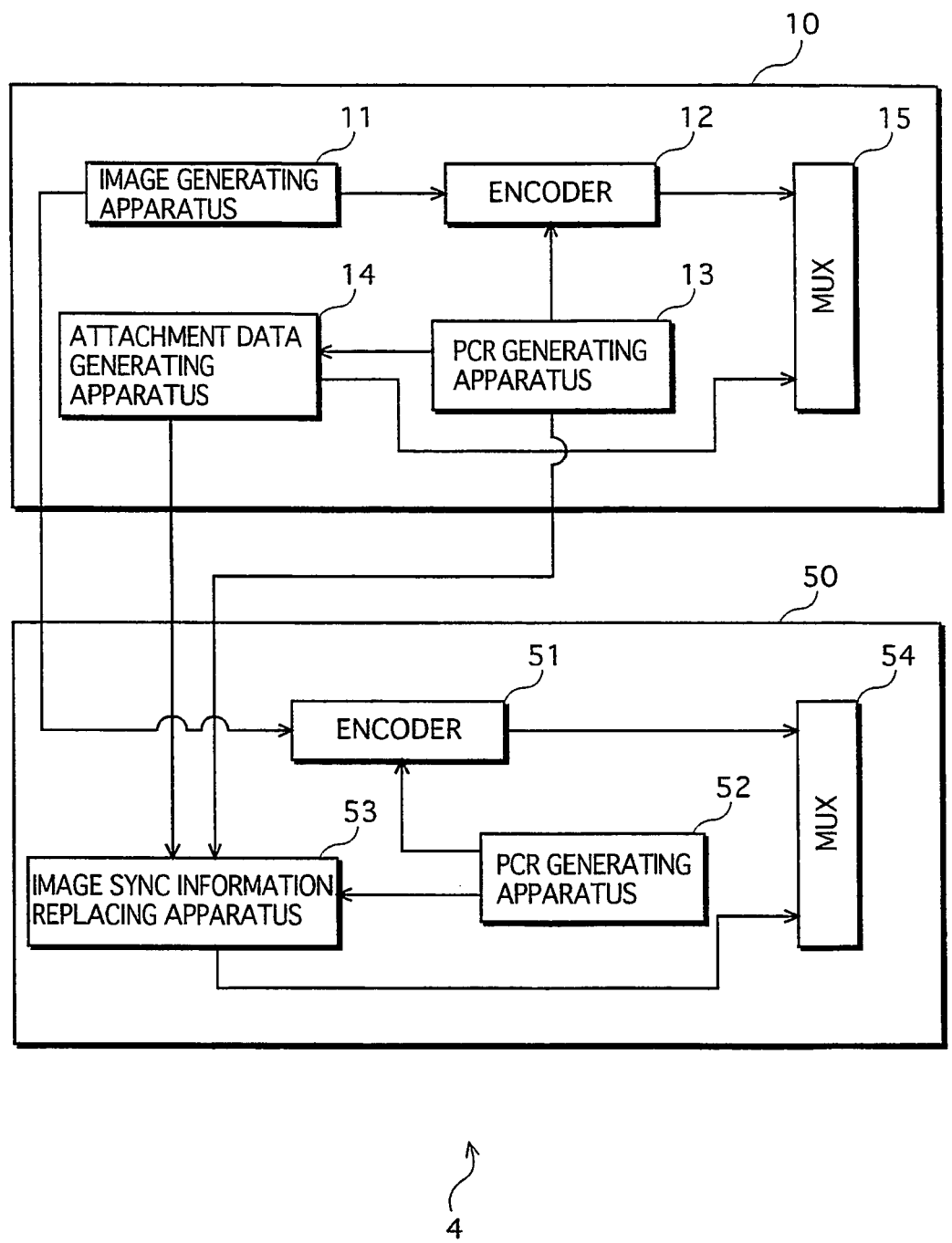
FIG. 17 shows the construction of the broadcast system in Embodiment 4.

The broadcast system 4 shown in FIG. 17 is different from the broadcast system 1 in Embodiment 1 in that the image sync information replacing apparatus 53 of the second broadcast apparatus 50 sequentially receives PCRs as standard PCRs from the PCR generating apparatus 13 via a dedicated line, and also sequentially receives PCRs from the PCR generating apparatus 52.

Figure 18:
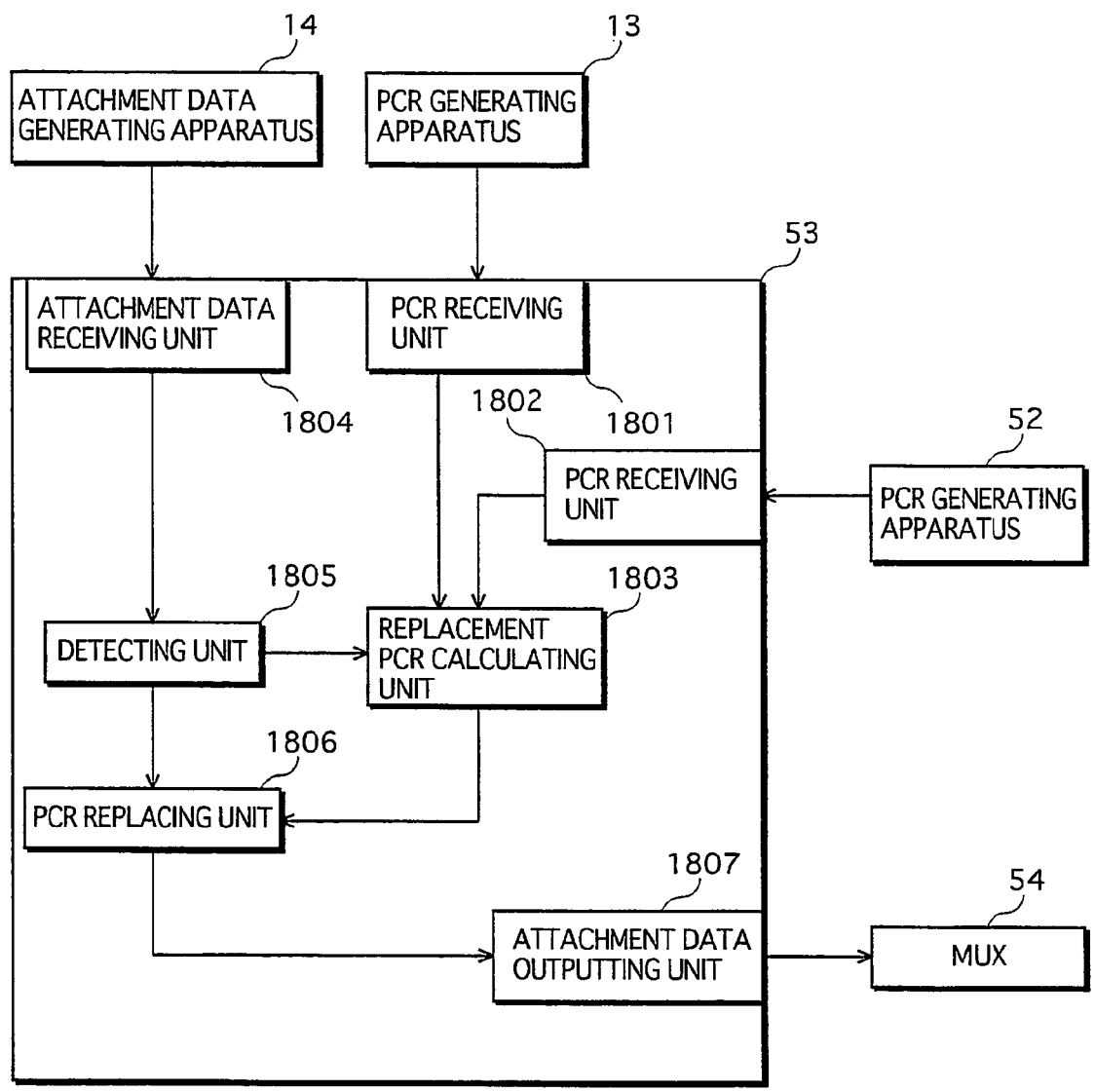
FIG. 18 is a block diagram showing the construction of the image sync information replacing apparatus in Embodiment 4.

FIG. 18 is a block diagram showing the construction of the image sync information replacing apparatus 53.

A PCR receiving unit 1801 sequentially receives standard PCRs from the PCR generating apparatus 13. The PCR receiving unit 1801 transfers the received standard PCRs to the replacement. PCR calculating unit 1803.

A PCR receiving unit 1802 sequentially receives PCRs from the PCR generating apparatus 52. The PCR receiving unit 1802 sequentially transfers the received PCRs to the replacement PCR calculating unit 1803.

A detecting unit 1805 detects the image sync information from the attachment data stream received by the PCR receiving unit 1801. The detecting unit 1805 transfers the PCR contained in the detected image sync information to the replacement PCR calculating unit 1803.

The replacement PCR calculating unit 1803 has (a) a function to calculate a difference d2 using (i) a PCR that is received from the PCR receiving unit 1802 simultaneously as a standard PCR is received from the PCR receiving unit 1801, (ii) the received standard PCR, and (iii) a transfer delay time "a" indicating a time period required to transfer a standard PCR, and store the calculated difference d2, and (b) a function to calculate a replacement PCR using (i) a PCR written in the image sync information read by the detecting unit 1805, (ii) the difference d2, and (iii) a transfer delay time "b" that indicates a time period required to transfer image data and is stored in a memory beforehand. The calculated replacement PCR is transferred to the PCR replacing unit 1806.

Operation 4

Figure 19:
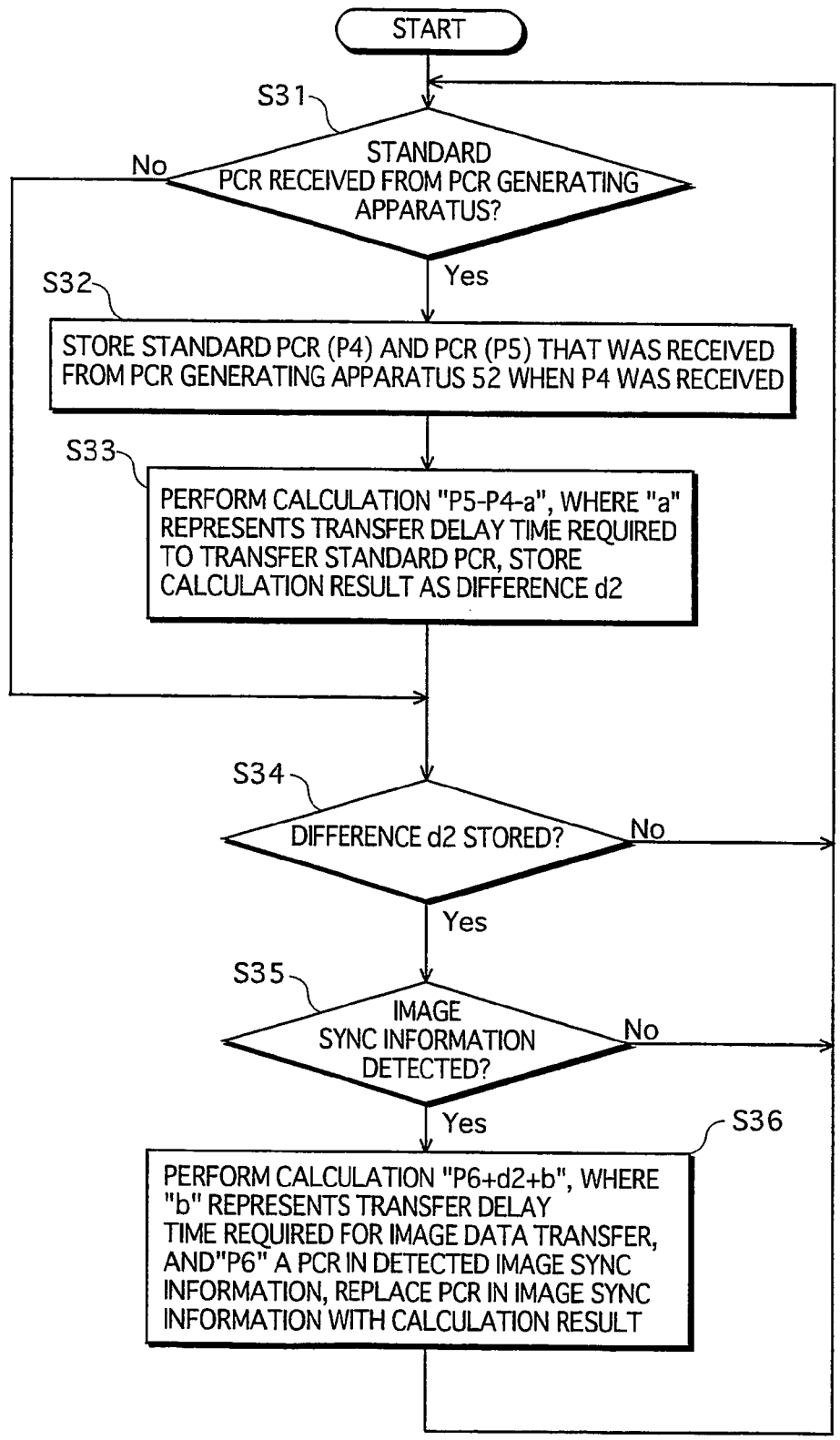
FIG. 19 is a flowchart showing the procedure of the image sync information replacement process in Embodiment 4.

The image sync information replacement process executed by the image sync information replacing apparatus 53 in Embodiment 4 will be described with reference to a flowchart. FIG. 19 is a flowchart showing the procedure of the image sync information replacement process in Embodiment 4.

First, in the image sync information replacing apparatus 53 shown in FIG. 18, if the PCR receiving unit 1801 receives a standard PCR (P4) (judged as "Yes" in step S31), the control goes to step S32 in which the replacement PCR calculating unit 1803 stores (a) P4 and (b) a PCR (P5) that was received from the PCR generating apparatus 52 when the PCR receiving unit 1801 received the P4 (step S32). The control then goes to step S33 in which the replacement PCR calculating unit 1803 obtains a difference d2 by performing a calculation "P5−P4−a", where "a" represents a transfer delay time "a" that indicates a time period required to transfer a standard PCR and is stored in a memory beforehand, and stores the calculated difference d2 (step S33). The control then goes to step S34.

When the PCR receiving unit 1801 does not receive the standard PCR (P4) (judged as "No" in step S31), the control skips to step S34.

If it is judged in step 34 that the difference d2 is stored (judged as "Yes" in step S34), the control goes to step S35. If it is judged in step 34 that the difference d2 is not stored, (judged as "No" in step S34), the control returns to step S31.

If it is judged in step 35 that the detecting unit 1805 detected the image sync information from the attachment data stream (judged as "Yes" in step S35), the control goes to step S36 in which the replacement PCR calculating unit 1803 receives a PCR (P6) from the detecting unit 1805, performs a calculation "P6+d2+b", where "d2" represents the stored difference d2 and "b" represents the transfer delay time b indicating the time period required for the image data transfer, and further performs a modular multiplication "X mod $2^{33}$", where X represents the result value of the addition. The result of the modular multiplication is transferred as a replacement PCR to the PCR replacing unit 1806. The PCR replacing unit 1806 replaces the PCR in the image sync information with the received replacement PCR (step s36). The control then returns to step S31.

If it is judged in step S35 that the detecting unit 1805 did not detect the image sync information from the attachment data stream (judged as "No" in step S35), the control returns to step S31.

More specifically, the image sync information replacing apparatus 53 stores in advance the values of the transfer delay times "a" and "b" expressed in units of the PCR clock (for example, 100 and 1100, respectively). For example, when the image sync information replacing apparatus 53 receives the PCR value of 1600 from the PCR generating apparatus 52, at the same time receiving the standard PCR value of 100 from the PCR generating apparatus 13, the difference d2 is calculated as 1600−100−100=1400.

Then if the detecting unit 1805 detects the image sync information having a PCR (P6) of a value 100, the replacement PCR calculating unit 1803 receives P6 from the detecting unit 1805, and performs a calculation "P6+d2+b", which results in 1000+1400+1100=3500. The replacement PCR calculating unit 1803 further performs a modular multiplication "3500 mod $2^{33}$", and transfers the result of the modular multiplication to the PCR replacing unit 1806 as a replacement PCR. The PCR replacing unit 1806 replaces the PCR (100) in the image sync information with the received replacement PCR (3500).

Embodiment 5

Embodiment 5 of the present invention is almost the same as Embodiment 4 in terms of the construction and data. Accordingly, only differences will be described here. Note that in Embodiment 5, (a) the transfer delay that occurs when data is transferred and (b) the encoding delay that occurs when image data is encoded are not considered.

In the broadcast system in Embodiment 5, the image sync information replacing apparatus of the second broadcast apparatus further includes a timer so that only when a "return-to-zero" occurs to the PCR generating apparatus of the second broadcast apparatus, a 0-obit process is executed.

It should be noted here that since the PCR generating apparatus repeatedly counts (generates) "0" to "$2^{33}-1$" as PCR values, it naturally happens that after counting "$2^{33}-1$" it counts "0" returning to the starting value. The term "return-to-zero" means such a return of the PCR value to 0. The occurrence of return-to-zero may cause the following problem. In Embodiments 2 and 4, the image sync information replacing apparatus calculates a difference between two PCRs respectively generated by the first and second broadcast apparatuses, and then if the image sync information is detected, adds the difference to a PCR written in the detected image sync information, and generates a replacement PCR by performing a modular multiplication "X mod $2^{33}$" where X represents the result of the addition. However, when a return-to-zero occurs to the PCR generating apparatus of the second broadcast apparatus, the reproduction of the image data is not synchronized with the reproduction of the attachment data until the next piece of image sync information is transferred to the second broadcast apparatus. The present embodiment provides a broadcast system that solves the above-described problem of the return-to-zero.

Construction 5

The broadcast system of Embodiment 5 has the same construction as Embodiment 4 shown in FIG. 17.

Figure 20:
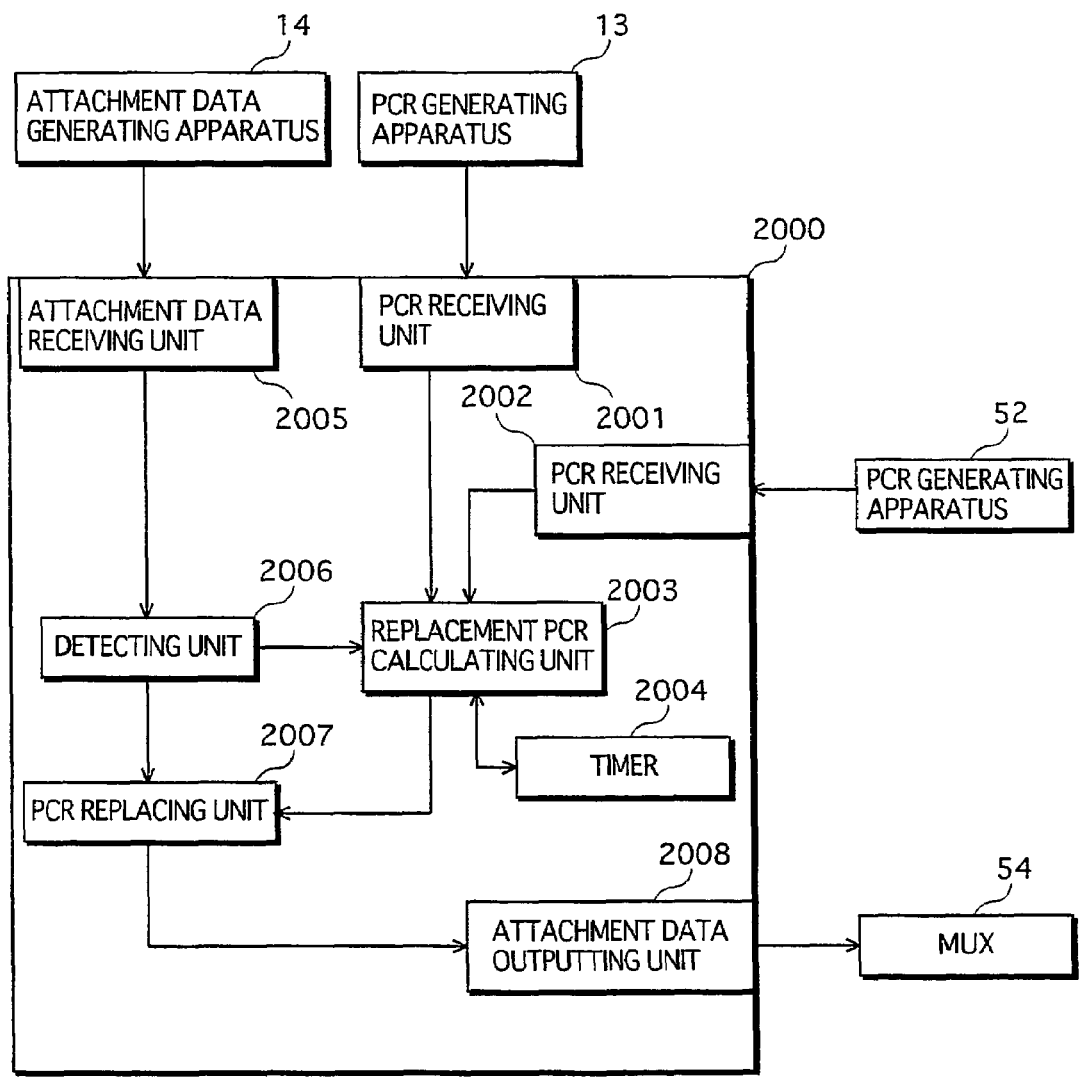
FIG. 20 is a functional block diagram showing the construction of the image sync information replacing apparatus in Embodiment 5.

FIG. 20 is a functional block diagram showing the construction of the image sync information replacing apparatus 2000. The image sync information replacing apparatus 2000 differs from the image sync information replacing apparatus in Embodiment 4 shown in FIG. 18 in that it has a timer 2004. The following describes the timer 2004 and functions of the functional units which are different from those in Embodiment 4.

The timer 2004 measures the time during a time period until a return-to-zero occurs, the time period being converted from a PCR value set by the replacement PCR calculating unit 2003, and notifies the replacement PCR calculating unit 2003 of the occurrence of the return-to-zero when the set time period has passed.

The replacement PCR calculating unit 2003 has (a) a function to, as it receives a standard PCR (P4) from the PCR receiving unit 2001, compare P4 with a PCR (P5) received from the PCR receiving unit 2002, and if the comparison result is P5>P4, performs a calculation "$2^{33}-P5$", and sets the timer 2004 to the calculation result, (b) a function to store a difference d3 which is a result of a calculation "P5−P4", (c) a function to calculate a replacement PCR using the stored difference d3 and a PCR written in the image sync information read by the detecting unit 2006, and (d) a function to perform the return-to-zero process when being notified of the return-to-zero from the timer 2004. The return-to-zero process will be described later. The calculated replacement PCR is transferred to the PCR replacing unit 2007.

Operation 5

Figure 21:
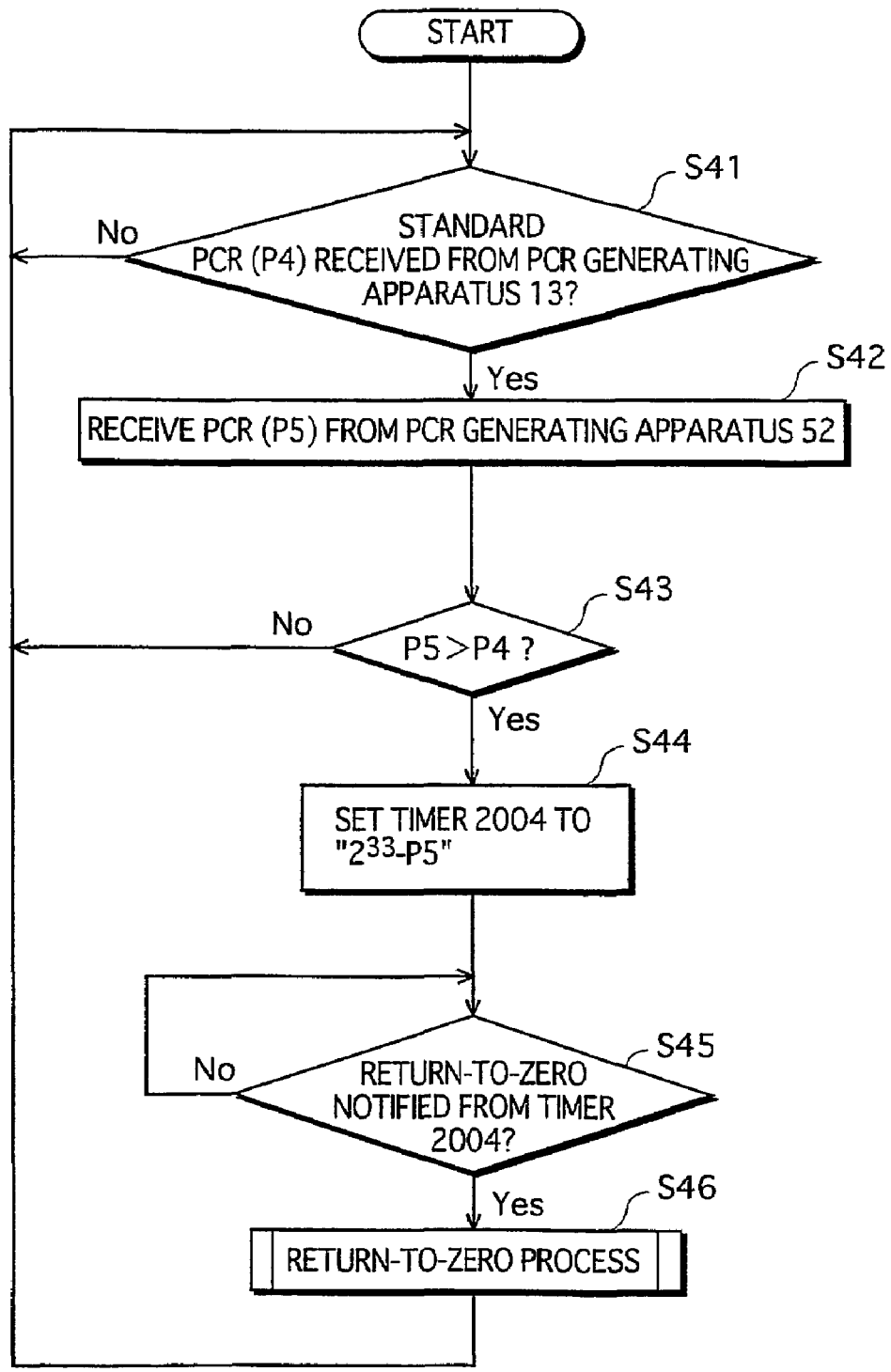
FIG. 21 is a flowchart showing the return-to-zero monitoring process in Embodiment 5.

The image sync information replacement process performed by the image sync information replacing apparatus 2000 in Embodiment 5 is the same as the operation described in Embodiment 4 except for the return-to-zero monitoring process. FIG. 21 is a flowchart showing the return-to-zero monitoring process.

In the image sync information replacing apparatus 2000, if the PCR receiving unit 2001 receives a standard PCR (P4) (judged as "Yes" in step S41), the control goes to step S42 in which the replacement PCR calculating unit 2003 holds a PCR (P5) which was received from the PCR generating apparatus 52 when P4 was received (step S42). The replacement PCR calculating unit 2003 then compares P4 with P5.

If it is judged as P5>P4 (judged as "Yes" in step S43), the control goes to step S44 in which the replacement PCR calculating unit 2003 performs a calculation "$2^{33}$−P5", and sets the timer 2004 to the calculation result (step S44).

If it is not judged as P5>P4 (judged as "No" in step S43), the control returns to step S41.

If it is judged that the replacement PCR calculating unit 2003 is notified of return-to-zero from the timer 2004 (judged as "Yes" in step S45), the control returns to step S46 in which the return-to-zero process is performed. The control then returns to step S41. If it is judged that the replacement PCR calculating unit 2003 is not notified of return-to-zero from the timer 2004 (judged as "No" in step S45), the process enters the wait state.

Figure 22:
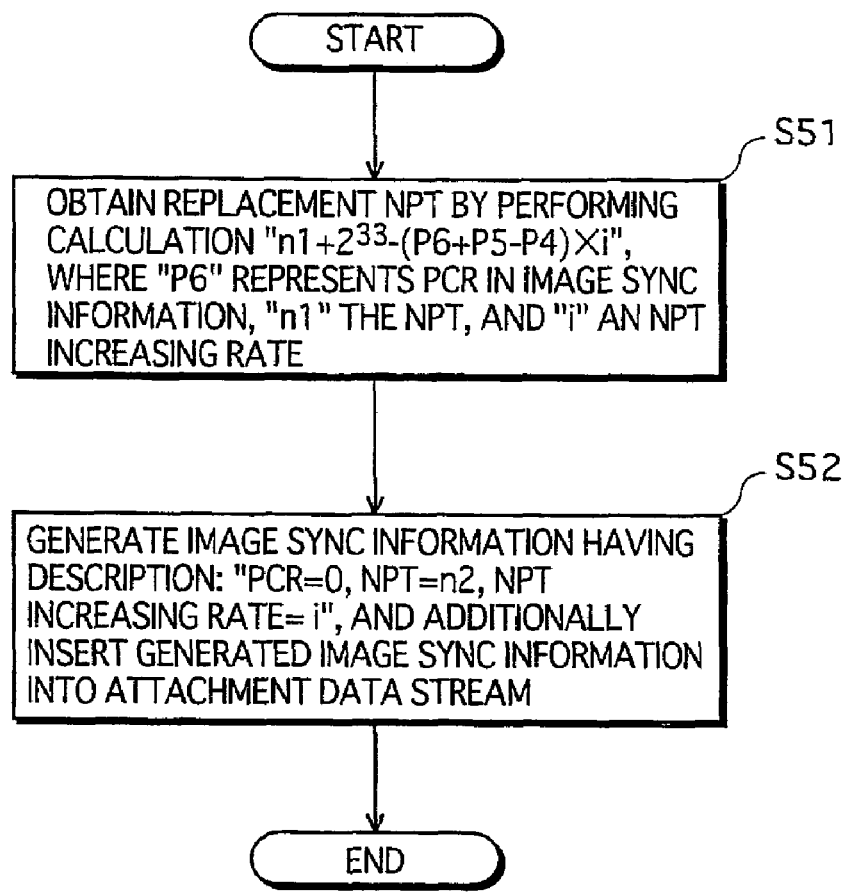
FIG. 22 is a flowchart showing the procedure of the return-to-zero process in Embodiment 5.

Now, the return-to-zero process will be described with reference to a flowchart. FIG. 22 is a flowchart showing the procedure of the return-to-zero process.

When it is notified of a return-to-zero from the timer 2004, the replacement PCR calculating unit 2003 performs a calculation "n1+$2^{33}$−(P6+P5−P4)×i", where "P6" represents a PCR written in the most recently received image sync information, "n1" the NPT, "i" the NPT increasing rate, "P4" the standard PCR received by the PCR receiving unit 2001, and "P5" the PCR received from the PCR generating apparatus 52 (step S51).

The replacement PCR calculating unit 2003 generates image sync information having a description: "PCR=0, NPT=n2, NPT increasing rate=i", and additionally inserts the generated image sync information into the attachment data stream (step S52).

With the above-described operation, even if a return-to-zero occurs to the second broadcast apparatus, a new piece of image sync information is generated and additionally inserted into the attachment data stream. This enables a receiver that receives a broadcast program composed of the above attachment data and image data to refer to the new piece of image sync information to synchronize the image data with the attachment data with correct timing.

Embodiment 6

Embodiment 6 of the present invention is almost the same as Embodiment 1 in terms of the construction and data. Accordingly, only differences will be described here. Note that in Embodiment 6, (a) the transfer delay that occurs when attachment data is transferred and (b) "return-to-zero" which is described in Embodiment 5 are not considered.

In the broadcast system in Embodiment 6, the first broadcast apparatus changes the image sync information by reflecting the encoding delay by the encoder, and the second broadcast apparatus calculates a replacement PCR reflecting (a) a difference between PCRs respectively generated by the first and second broadcast apparatuses and (b) the encoding delay by the encoder, and replaces the PCR written in the image sync information with the calculated replacement PCR. This arrangement aims to deal with a problem that occurs when the encoders of the first and second broadcast apparatuses have different encoding performances.

Construction 6

Figure 23:
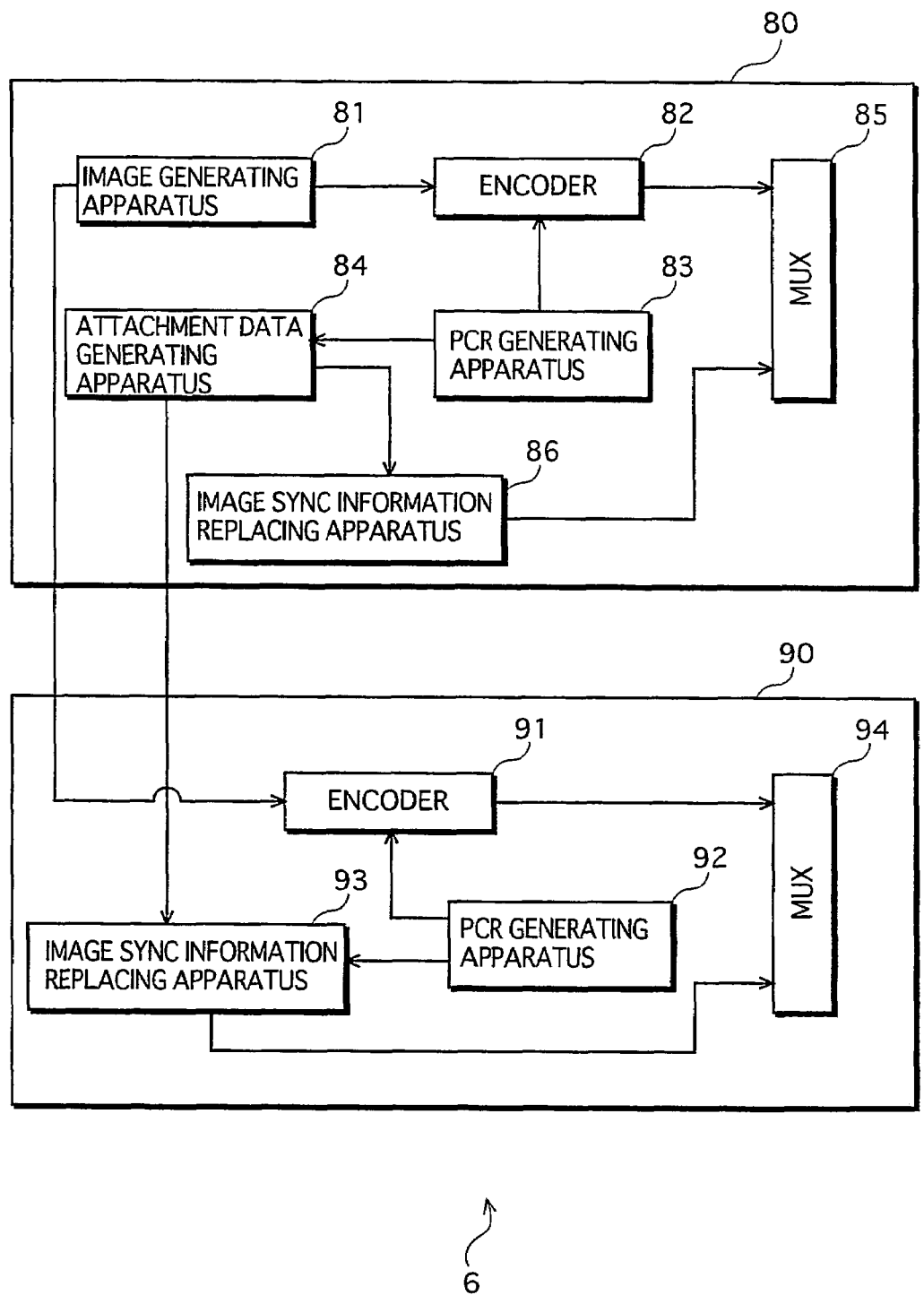
FIG. 23 shows the construction of the broadcast system in Embodiment 6.

The broadcast system 6 shown in FIG. 23 is different from the broadcast system 1 in Embodiment 1 in that the first broadcast apparatus 80 further includes an image sync information replacing apparatus 86. Accordingly, only the image sync information replacing apparatus 86 will be described here.

The image sync information replacing apparatus 86 calculates a replacement PCR reflecting the encoding delay that occurs when the encoder 82 encodes image data, and replaces a PCR in the image sync information generated by the attachment data generating apparatus 84 with the calculated replacement PCR.

Operation 6

The image sync information replacing apparatus 86 reads a PCR written in the image sync information contained in the attachment data stream, calculates a replacement PCR by adding to the read PCR a PCR value that is equal to an encoding delay that occurs when the encoder 82 encodes image data, and replaces the PCR in the image sync information with the calculated replacement PCR.

For example, when the encoding delay is 0.5 seconds and the PCR written in the image sync information has a value of "100", then the PCR value that is equal to the encoding delay is calculated as "0.5×90,000=45,000", and the replacement PCR is calculated as "100+45,000=45,100".

The image sync information replacing apparatus 93 has almost the same function as the image sync information replacing apparatus 23 in Embodiment 1, but differs from it in that the image sync information replacing apparatus 93 generates a replacement PCR that reflects the encoding delay that occurs when the encoder 91 encodes.

The image sync information replacing apparatus 93 reads a PCR written in the image sync information contained in the attachment data stream, calculates a replacement PCR by adding to the read PCR (a) a PCR value that is equal to an encoding delay that occurs when the encoder 91 encodes image data and (b) a difference between a standard time of the PCR generating apparatus 83 and a standard time of the PCR generating apparatus 92, and replaces the PCR in the image sync information with the calculated replacement PCR.

For example, when the difference between a standard time of the PCR generating apparatus 83 and a standard time of the PCR generating apparatus 92 is "400", the encoding delay is 0.3 seconds, and the PCR written in the image sync information has a value of "100", then the PCR value that is equal to the encoding delay is calculated as "0.3×90,000=27,000", and the replacement PCR is calculated as "400+100+27,000=27,500".

Supplements

The digital broadcast system of the present invention has been described through Embodiments 1 to 6. However, the present invention can be achieved in more various ways other than these embodiments. The following are such examples.

(1) Embodiment 2 may be modified as: if the image sync information replacing apparatus 33 fails to receive a PCR from the PCR generating apparatus 32 simultaneously with a standard PCR, it may calculate an approximate value of a PCR that should have been received from the PCR generating apparatus 32 using an approximate time when the standard PCR was received, and may use the calculated PCR value to calculate an approximate value of the difference d1.

(2) In Embodiment 3, the image sync information replacing apparatus 43 calculates a replacement PCR based on a program start trigger generated by the program start trigger generating apparatus 45. However, the calculation of the replacement PCR may be based on the "net-Q" signal which is used to notify the timing for an image change.

(3) In Embodiment 3, the image sync information replacing apparatus 43 obtains a program start trigger from the program start trigger generating apparatus 45 included in the second broadcast apparatus 40. However, the image sync information replacing apparatus 43 may obtain a program start trigger from an external apparatus (for example, from the program start trigger generating apparatus included in the first broadcast apparatus). The program start trigger may be transferred using an ancillary area of the image data, may be transferred via a dedicated line, or may be transferred via a public line using the Internet or the like.

(4) The above embodiments are described based on MPEG2-TS digital broadcasting. However, not limited to MPEG2-TS digital broadcasting, the present invention can be applied to any broadcasting system in which the image sync information is used to synchronize the image data with the attachment data.

(5) In each of the above embodiments, a broadcast program is composed of image data and attachment data. However, a broadcast program may be composed of audio data and attachment data, may be composed of image data, audio data, and attachment data (6) Each of the image sync information replacement process procedures performed by the image sync information replacing apparatus in each embodiment (for example, the procedures shown in FIGS. 9, 13, 16, 19, 21, and 22) maybe recorded on a recording medium for distribution as a program for causing a machine to perform the procedure. Alternatively, such programs may be distributed via a communication line or the like.

Such recording mediums include an IC card, optical disc, flexible disc, and ROM. A distributed program is installed into a machine having a program execution function, and the machine operates as the image sync information replacing apparatus as described in one of the above embodiments by executing the installed program.

INDUSTRIAL APPLICABILITY

The present invention can be applied to a broadcast system in which a broadcast program composed of contents data and attachment data is provided from a first broadcast apparatus to a second broadcast apparatus. The image sync information replacing apparatus of the present invention enables a receiver, which receives a broadcast program broadcast by the second broadcast apparatus that receives the program from the first broadcast apparatus, to reproduce the image data in synchronization with the attachment data correctly.

The invention claimed is:

1. A broadcast system comprising a first broadcast apparatus and a second broadcast apparatus, wherein the first broadcast apparatus including:
   a first time value generating means for sequentially generating first time values that indicate current times relative to a first standard time and are repeatedly counted and generated in sequence in a range from a value "0" to an upper limit value, returning to 0 from the upper limit value;
   a first encoding means for encoding contents stream to generate a first encoded contents stream and attaching the generated first time values to the first encoded contents stream for each unit of decoding/reproduction of the first encoded contents stream;
   an attachment data generating means for generating attachment data that is to be reproduced in synchronization with the first encoded contents stream and includes sync information which contains (i) one of the first time values generated by the first time value generating means, and (ii) a relative time value to the first time value, the relative time value indicating timing with which the attachment data is generated;
   a first broadcast means for multiplexing and broadcasting the first encoded contents stream and the attachment data; and
   a supplying means for supplying the second broadcast apparatus with the contents stream and the attachment data,
the second broadcast apparatus including:
   a second time value generating means for sequentially generating second time values that indicate current times relative to a second standard time and are repeatedly counted and generated in sequence in a range from a value "0" to the upper limit value, returning to 0 from the upper limit value;
   a second encoding means for encoding the contents stream, which is supplied from the supplying means of the first broadcast apparatus, to generate a second encoded contents stream and attaching the generated second time values to the second encoded contents stream for each unit of decoding/reproduction of the second encoded contents stream;
   a detecting means for detecting the sync information from the attachment data supplied from the supplying means of the first broadcast apparatus;
   a calculating means for calculating a replacement time value which is obtained by performing a modular multiplication denoted as "X mod A", wherein the "X" represents a result value of an addition of (a) the first time value contained in the detected sync information to (b) a difference value that indicates a temporal difference between the first standard time and the second standard time, and the "A" represents the upper limit value;
   a replacing means for replacing the first time value contained in the detected sync information with the replacement time value calculated by the calculating means; and
   a second broadcast means for multiplexing and broadcasting the second encoded contents stream and the attachment data that includes the sync information containing the replacement time value.

2. The broadcast system of claim 1, wherein
the attachment data generating means adds the first time values generated by the first time value generating means, to the attachment data,
the detecting means detects the first time values from the attachment data supplied from the supplying means of the first broadcast apparatus,
the calculating means includes
a difference value storing means for, for each of the detected first time values, calculating a difference between a detected first time value and a second time value that is generated by the second time value generating means when the first time value is detected, and storing the calculation result as the difference value, and
the calculating means calculates the replacement time value by performing a modular multiplication denoted as "X1 mod A", wherein the "X1" represents a result value of an addition of (a) the first time value contained in the detected sync information to (b) the difference value stored in the difference value storing means, and the "A" represents the upper limit value.

3. The broadcast system of claim 1, wherein
the second broadcast apparatus further includes
a first time value receiving means for receiving one of the first time values generated by the first time value generating means, and
the calculating means includes
a storing means for calculating a difference between the first time value received by the first time value receiving means and a second time value that is generated by the second time value generating means when the first time value is received, and storing the calculation result as the difference value, and
the calculating means calculates the replacement time value by performing a modular multiplication denoted as "X2 mod A", wherein the "X2" represents a result value of an addition of (a) the first time value contained in the detected sync information to (b) the difference value stored in the storing means, and the "A" represents the upper limit value.

4. The broadcast system of claim 1, wherein
the second broadcast apparatus further includes
a program start trigger generating means for generating a program start trigger a predetermined time period earlier than a scheduled program start time of a broadcast program that is composed of the contents stream and the attachment data, the program start trigger indicating that the broadcast program starts the predetermined time period later, and
the calculating means includes:
a first storing means for obtaining a second time value that is generated by the second time value generating means when the program start trigger generating means generates the program start trigger, calculating a program start time value that indicates a time that is the predetermined time period later than the obtained second time value, and storing the calculated program start time value; and
a second storing means for, if the relative time value contained in the detected sync information is 0, calculating a difference between the first time value contained in the detected sync information and the program start time value stored in the first storing means, and storing the calculation result as the difference value, and
if, after the difference value is stored in the second storing means, the detecting means detects sync information that contains a relative time value that is not 0, the calculating means calculates the replacement time value by performing a modular multiplication denoted as "X3 mod A", wherein the "X3" represents a result value of an addition of (a) the first time value contained in the sync information containing the relative time value of not 0 to (b) the difference value stored in the second storing means, and the "A" represents the upper limit value, and
if the relative time value contained in the sync information detected by the detecting means is 0, the replacing means replaces the first time value contained in the detected sync information with the program start time value stored in the first storing means, and if the relative time value contained in the sync information detected by the detecting means is not 0, the replacing means replaces the first time value contained in the detected sync information with the replacement time value calculated by the calculating means.

5. The broadcast system of claim 1 further comprising
a program start trigger generating means for generating a program start trigger a predetermined time period earlier than a scheduled program start time of a broadcast program that is composed of the contents stream and the attachment data, the program start trigger indicating that the broadcast program starts the predetermined time period later, and the calculating means includes:
a first storing means for obtaining a second time value that is generated by the second time value generating means when the program start trigger generating means generates the program start trigger, calculating a program start time value that indicates a time that is the predetermined time period later than the obtained second time value, and storing the calculated program start time value; and
a second storing means for, if the relative time value contained in the detected sync information is 0, calculating a difference between the first time value contained in the detected sync information and the program start time value stored in the first storing means, and storing the calculation result as the difference value, and
if, after the difference value is stored in the second storing means, the detecting means detects sync information that contains a relative time value that is not 0, the calculating means calculates the replacement time value by performing a modular multiplication denoted as "X4 mod A", wherein the "X4 represents a result value of an addition of (a) the first time value contained in the sync information containing the relative time value of not 0 to (b) the difference value stored in the second storing means, and the "A" represents the upper limit value, and
if the relative time value contained in the sync information detected by the detecting means is 0, the replacing means replaces the first time value contained in the detected sync information with the program start time value stored in the first storing means, and if the relative time value contained in the sync information detected by the detecting means is not 0, the replacing means replaces the first time value contained in the detected sync information with the replacement time value calculated by the calculating means.

6. The broadcast system of claim 1, wherein
the second broadcast apparatus further includes
a first time value receiving means for receiving one of the first time values generated by the first time value generating means, and
the calculating means includes:
a first storing means for storing a transfer delay value that indicates a time period, recognized as a transfer delay, required for supplying the contents stream by the supplying means; and
a second storing means for calculating a difference between the first time value received by the first time value receiving means and a second time value that is generated by the second time value generating means when the first time value is received, and storing the calculation result as the difference value, and
the calculating means calculates the replacement time value by performing a modular multiplication denoted as "X5 mod A", wherein the "X5 represents a result value of an addition of (a) the first time value contained in the detected sync information and (b) the transfer delay value stored in the first storing means to (c) the difference value stored in the second storing means, and the "A" represents the upper limit value.

7. The broadcast system of claim 1, wherein
the second broadcast apparatus further includes
a first time value receiving means for receiving one of the first time values generated by the first time value generating means, and
the calculating means includes:
a first storing means for storing a first transfer delay value that indicates a time period, recognized as a transfer delay, required for transferring the first time value received by the first time value receiving means;

a second storing means for storing a second transfer delay value that indicates a time period, recognized as a transfer delay, required for supplying the contents stream by the supplying means; and a third storing means for calculating a difference between the first time value received by the first time value receiving means and a second time value that is generated by the second time value generating means when the first time value is received, then subtracting the first transfer delay value stored in the first storing means from the calculated difference, and storing the calculation result as the difference value, and the calculating means calculates the replacement time value by performing a modular multiplication denoted as "X6 mod A", wherein the "X6" represents a result value of an addition of (a) the first time value contained in the detected sync information and (b) the second transfer delay value stored in the second storing means to (c) the difference value stored in the third storing means, and the "A" represents the upper limit value.

8. The broadcast system of claim 1, wherein the first broadcast apparatus further includes a sync information replacing means for detecting the sync information from the attachment data generated by the attachment data generating means, calculating a first replacement time value which is obtained by adding (a) the first time value contained in the detected sync information to (b) a first delay value that indicates a time period, recognized as an encoding delay, required for encoding the contents stream by the first encoding means, and replacing the first time value contained in the detected sync information with the calculated first replacement time value, and the calculating means calculates the replacement time value by performing a modular multiplication denoted as "X7 mod A", wherein the "X7" represents a result value of an addition of (a) the first time value contained in the detected sync information and (b) the difference value to (c) a second delay value that indicates a time period, recognized as an encoding delay, required for encoding the contents stream by the second encoding means, and the "A" represents the upper limit value.

9. A broadcast system comprising a first broadcast apparatus and a second broadcast apparatus, wherein the first broadcast apparatus including:

a first time value generating means for sequentially generating first time values that indicate current times relative to a first standard time and are repeatedly counted and generated in sequence in a range from a value "0" to an upper limit value, returning to 0 from the upper limit value;

a first encoding means for encoding contents stream to generate a first encoded contents stream and attaching the generated first time values to the first encoded contents stream for each unit of decoding/reproduction of the first encoded contents stream;

an attachment data generating means for generating attachment data that is to be reproduced in synchronization with the first encoded contents stream and includes sync information which contains (i) one of the first time values generated by the first time value generating means, (ii) a relative time value to the first time value, the relative time value indicating timing with which the attachment data is generated, and (iii) a value indicating an increasing rate of the relative time value;

a first broadcast means for multiplexing and broadcasting the first encoded contents stream and the attachment data; and a supplying means for supplying the second broadcast apparatus with the contents stream and the attachment data, the second broadcast apparatus including:

a second time value generating means for sequentially generating second time values that indicate current times relative to a second standard time and are repeatedly counted and generated in sequence in a range from a value "0" to the upper limit value, returning to 0 from the upper limit value;

a second encoding means for encoding the contents stream, which is supplied from the supplying means of the first broadcast apparatus, to generate a second encoded contents stream and attaching the generated second time values to the second encoded contents stream for each unit of decoding/reproduction of the second encoded contents stream;

a first time value receiving means for receiving one of the first time values generated by the first time value generating means;

a timer means for measuring a set time period;

a detecting means for detecting the sync information from the attachment data supplied from the supplying means of the first broadcast apparatus;

a storing means for calculating and storing a first difference value that indicates a difference between the first time value received by the first time value receiving means and a second time value that is generated by the second time value generating means when the first time value is received by the first time value receiving means;

a time values comparing means for comparing in size the first time value received by the first time value receiving means and the second time value that is generated by the second time value generating means when the first time value is received by the first time value receiving means;

a setting means for, if a comparison result by the time values comparing means indicates that the second time value is larger than the first time value, setting a time period, which is taken until the second time value generating means generates the upper limit value, to the timer means;

a calculating means for, immediately after the timer means has measured the set time period, calculating a replacement time value which is obtained by performing an addition of the first time value contained in the detected sync information to the first difference value stored in the storing means, multiplying a result of the addition by the increasing rate, obtaining a second difference value that indicates a difference between the upper limit value and a result of the multiplication, and adding the second difference value to the relative time value contained in the detected sync information;

an inserting means for additionally inserting, into the attachment data, sync information that includes (1) value "0" as the first time value and (2) the replacement time value calculated by the calculating means, as the relative time value; and a second broadcast means for multiplexing and broadcasting the second encoded contents stream and the attachment data that includes the sync information inserted by the inserting means.

10. A broadcast apparatus comprising:

a means for receiving contents stream and attachment data attached thereto, from an external apparatus;

a time value generating means for sequentially generating first time values that indicate current times relative to a first standard time and are repeatedly counted and generated in sequence in a range from a value "0" to an upper limit value, returning to 0 from the upper limit value;

an encoding means for encoding the received contents stream to generate an encoded contents stream and attaching the generated first time values to the encoded contents stream for each unit of decoding/reproduction of the encoded contents stream;

a detecting means for detecting, from the received attachment data, sync information that includes (i) one of second time values that indicate current times relative to a second standard time and are repeatedly counted and generated in sequence in a range from a value "0" to the upper limit value, returning to 0 from the upper limit value, and (ii) a relative time value to the second time value, the relative time value indicating timing with which the attachment data is reproduced;

a calculating means for calculating a replacement time value which is obtained by performing a modular multiplication denoted as "X8 mod A", wherein the "X8" represents a result value of an addition of (a) the second time value contained in the detected sync information to (b) a difference value that indicates a temporal difference between the first standard time and the second standard time, and the "A" represents the upper limit value;

a replacing means for replacing the second time value contained in the detected sync information with the replacement time value calculated by the calculating means; and a broadcast means for multiplexing and broadcasting the encoded contents stream and the attachment data that includes the sync information containing the replacement time value.

11. The calculating means for calculating a replacement time value which is obtained by performing a modular multiplication denoted as "X8 mod A" of claim 10, wherein the "X8" represents a results value of an addition of (a) the second time value contained in the detected sync information and (b) the difference value to (c) a delay value that indicates a time period, recognized as an encoding delay, required for encoding the contents stream by an encoding means, and the "A" represents the upper limit value.

12. A broadcast method comprising:
a step for receiving contents stream and attachment data attached thereto, from an external apparatus;
an encoding step for encoding the received contents stream to generate an encoded contents stream and attaching first time values, which are sequentially generated by a time value generating means and indicate current times relative to a first standard time and are repeatedly counted and generated in sequence in a range from a value "0" to an upper limit value, returning to 0 from the upper limit value, to the encoded contents stream for each unit of decoding/reproduction of the encoded contents stream;
a detecting step for detecting, from the received attachment data, sync information that includes (i) one of second time values that indicate current times relative to a second standard time and are repeatedly counted and generated in sequence in a range from a value "0" to the upper limit value, returning to 0 from the upper limit value, and (ii) a relative time value to the second time value, the relative time value indicating timing with which the attachment data is reproduced;
a calculating step for calculating a replacement time value which is obtained by performing a modular multiplication denoted as "X8 mod A", wherein the "X8" represents a result value of an addition of (a) the second time value contained in the detected sync information to (b) a difference value that indicates a temporal difference between the first standard time and the second standard time, and the "A" represents the upper limit value;
a replacing step for replacing the second time value contained in the detected sync information with the calculated replacement time value; and
a broadcast step for multiplexing and broadcasting the encoded contents stream and the attachment data that includes the sync information containing the replacement time value.

13. A recording medium storing therein a program for causing a computer to function as a broadcast apparatus that includes:
a means for receiving contents stream and attachment data attached thereto, from an external apparatus;
a time value generating means for sequentially generating first time values that indicate current times relative to a first standard time and are repeatedly counted and generated in sequence in a range from a value "0" to an upper limit value, returning to 0 from the upper limit value;
an encoding means for encoding the received contents stream to generate an encoded contents stream and attaching the generated first time values to the encoded contents stream for each unit of decoding/reproduction of the encoded contents stream;
a detecting means for detecting, from the received attachment data, sync information that includes (i) one of second time values that indicate current times relative to a second standard time and are repeatedly counted and generated in sequence in a range from a value "0" to the upper limit value, returning to 0 from the upper limit value, and (ii) a relative time value to the second time value, the relative time value indicating timing with which the attachment data is reproduced;
a calculating means for calculating a replacement time value which is obtained by performing a modular multiplication denoted as "X8 mod A", wherein the "X8" represents a result value of an addition of (a) the second time value contained in the detected sync information to (b) a difference value that indicates a temporal difference between the first standard time and the second standard time, and the "A" represents the upper limit value;
a replacing means for replacing the second time value contained in the detected sync information with the replacement time value calculated by the calculating means; and
a broadcast means for multiplexing and broadcasting the encoded contents stream and the attachment data that includes the sync information containing the replacement time value.

* * * * *